United States Patent Office 3,140,253
Patented July 7, 1964

3,140,253
CATALYTIC HYDROCARBON CONVERSION WITH A CRYSTALLINE ZEOLITE COMPOSITE CATALYST
Charles J. Plank, Woodbury, and Edward J. Rosinski, Deptford, N.J., assignors to Socony Mobil Oil Company, Inc., a corporation of New York
No Drawing. Filed May 1, 1964, Ser. No. 364,301
38 Claims. (Cl. 208—120)

This invention relates to catalyst compositions and, more particularly, to aluminosilicate catalysts either alone or admixed with a porous matrix containing both rare earth metal cations and protons or proton precursors, their method of preparation and the use of the same for catalyzing hydrocarbon conversion reactions.

A considerable number of materials have heretofore been proposed as catalysts for the conversion of hydrocarbons into one or more desired products. In the catalytic cracking of hydrocarbon oils, for example, wherein hydrocarbon oils of higher boiling range are converted into hydrocarbons of lower boiling range, notably hydrocarbons boiling in the motor fuel range, the catalysts most widely used are solid materials which behave in an acidic manner whereby hydrocarbons are cracked. Although acidic catalysts of this type possess one or more desired characteristics, a great many of these catalysts have undesirable characteristics, such as lack of thermal stability, availability, or mechanical strength, etc., whereby a wide range of suitable properties cannot be maintained. Synthetic silica-alumina composites, the most popular catalysts known to have been proposed heretofore, provide limited yields of gasoline for a given yield of coke and further suffer the disadvantage of rapidly deteriorating and becoming inactive in the presence of steam, particularly at temperatures above 1000° F. Other catalysts less widely used include those materials of an argillaceous nature, e.g., bentonite and montmorillonite, which have been treated with acids to bring out their latent cracking characteristics. Catalysts of this general type are relatively inexpensive but are only moderately active and exhibit a decline in activity over periods of many conversion and regeneration cycles. Some synthetic materials, such as silica-magnesia complexes, are more active than conventional silica-alumina catalysts and undergo normal aging but have limited utility because of their product distribution as evidenced, for example, by low octane number of the gasoline.

Other disadvantages of the heretofore proposed catalysts include poor activity, chemical stability and product distribution in obtaining desired yields of useful products.

The present invention is based on a discovery that aluminosilicates containing both hydrogen ions and rare earth metal cations are highly active catalysts for a wide variety of chemical processes, particularly those chemical processes involving hydrocarbon conversions when used either alone or admixed with a porous matrix. The catalysts of this invention possess a wide spectrum in magnitude of catalytic activity; can be used in relatively small concentrations; and permit certain hydrocarbon conversion processes to be carried out under practicable and controllable rates at lower temperatures than those previously employed. In the catalytic cracking of hydrocarbon oils into hydrocarbon products of lower molecular weight, for example, the reaction rates per unit volume of catalyst that are obtainable by the catalysts of this invention vary up to many thousands times the rates achieved with the best siliceous catalysts heretofore proposed.

The high activity catalysts contemplated herein are aluminosilicate compositions which are strongly acidic in character as a result of treatment with a fluid medium containing at least one rare earth metal cation and a hydrogen ion or ion capable of conversion to a hydrogen ion. Inorganic and organic acids broadly represent the source of hydrogen ions; rare earth metal salts the source of rare earth cation; and ammonium compounds, or salts of organic nitrogen compounds, the source of cations capable of conversion to hydrogen ions. The product resulting from treatment with a fluid medium is an activated crystalline and/or amorphous aluminosilicate in which the structure thereof has been modified primarily to the extent of having the protons and rare earth cations chemisorbed or ionically bonded thereto.

In preparing the catalyst compositions of this invention, the aluminosilicate can be contacted with a nonaqueous or aqueous fluid medium comprising a gas, polar solvent or water solution containing the desired hydrogen ion or ammonium ion capable of conversion to a hydrogen ion and at least one rare earth metal salt soluble in the fluid medium. Alternatively, the aluminosilicate can be first contacted with a fluid medium containing a hydrogen or ammonium ion capable of conversion to a hydrogen ion and then with a fluid medium containing at least one rare earth salt. Similarly, the aluminosilicate can be first contacted with a fluid medium containing at least one rare earth metal cation and then with a fluid medium containing a hydrogen ion or ion capable of conversion to a hydrogen ion or a mixture of both. Although any one of the above three methods can be used to prepare the novel catalyst compositions of the instant invention, the first method, i.e., treatment with a fluid medium containing a hydrogen ion or ion capable of conversion to a hydrogen ion and a rare earth cation, is the most preferred. Additionally, water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and rare earth metal salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butonol, etc.; and miscellaneous solvents such as dimethylformamide, and the like.

The hydrogen ion, ammonium ion or rare earth cation may be present in the fluid medium in an amount varying within wide limits depending upon the pH of the fluid medium. Where the aluminosilicate material has a molar ratio of silica to alumina greater than about 5.0, the fluid medium may contain a hydrogen ion, rare earth cation, ammonium ion, or mixtures thereof, equivalent to a pH value ranging from less than 1.0 up to a pH value of about 12.0. Within these limits, pH values for fluid media containing a rare earth cation and/or an ammonium ion range from 3.5 to 10.0 and are preferably between a pH value of 4.5 and 8.5. For fluid media containing a hydrogen ion alone or with a rare earth cation, the pH values range from less than 1.0 up to about 7.0, and are preferably within the range of less than 1.0 up to 4.5. Where the molar ratio of silica to alumina is greater than about 2.2 and less than about 5.0, the pH value for fluid media containing a hydrogen ion or metal cation ranges from 3.8 to 8.5. Where ammonium ions are employed, either alone or in combination with rare earth cations, the pH value ranges from 4.5 to 9.5 and is preferably within the limit of 4.5 to 8.5. Where the aluminosilicate material has a molar ratio of silica to alumina of less than about 3.0, the preferred medium is a fluid medium containing an ammonium ion instead of a hydrogen ion. Thus, depending upon the silica to alumina ratio, the pH value can vary within rather wide limits. In those instances where the fluid medium containing an acid is unfavorable to the molecular structure of the aluminosilicate, a fluid medium may consist, for example, of a vaporized ammonium compound, such as ammonium chloride, or an aqueous or a non-aqueous medium containing the same or organic nitrogen bases including salts thereof. In this manner, aluminosilicates otherwise unsuitable for treatment with an acid-containing fluid medium are readily activated to provide useful catalyst compositions.

In carrying out the treatment with the fluid medium, the procedure employed varies depending upon the particular aluminosilicate which is treated. If the aluminosilicate which is treated has alkali metal cations associated therewith, e.g., Zeolite X, then the treatment with the fluid medium or media should be carried out until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations. On the other hand, if the aluminosilicate which is treated with the desired fluid medium is substantially free of alkali metal cations, i.e., a calcium aluminosilicate, then the treatment need not be carried out until such time as the metal is exhausted since the presence of metals other than alkali metals does not seriously limit catalytic properties. Effective treatment with the fluid medium to obtain a modified aluminosilicate having high catalytic activity will vary, of course, with the duration of the treatment and the temperature at which the treatment is carried out. Elevated temperatures tend to hasten the speed of treatment whereas the duration thereof varies inversely with the general concentration of ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between 5 and 8. The aluminosilicate material is thereafter analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of the hydrogen ions, ammonium ions and rare earth metal cations in the form of a molten material, vapor, aqueous or non-aqueous solution may be passed slowly through a fixed bed of aluminosilicate. If desired, hydrothermal treatment or corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NSO_3H$), amidodisulfonic acid $$(NH(SO_3H_2)$$

chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$), hydroxyamine disulfonic acid (($HSO_3)_2NOH$), nitric acid, nitrous acid, hyponitrous acid, carbonic acid and the like.

Typical organic acids which find utility in the practice of the invention include monocarboxylic, dicarboxylic and polycarboxylic acids which can be aliphatic, aromatic, or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1-8-naphthalenedicarboxylic acid, 1,2-naphthalenedicarboxylic acid, tetrahydrophthalic acid, 3-carboxcinnamic acid, hydrocinnamic acid, pyrogallic acid, benzoic acid, ortho-, meta- and para-methyl, hydroxyl, chloro, bromo- and nitro-substituted benzoic acids, phenylacetic acid, mandelic acid, benzylic acid, hippuric acid, benzenesulfonic acid, toluenesulfonic acid, methanesulfonic acid and the like.

Other sources of hydrogen ions include carboxyl polyesters prepared by the reaction of an excess polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium sulfide, ammonion thiocyanate, ammonium dithiocarbamate, ammonium peroxysulfate, ammonium acetate, ammonium tungstate, ammonium hydroxide, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartrate, and the like. Still other ammonium compounds which can be employed include tetraalkyl and tetraaryl ammonium salts such as tetramethylammonium hydroxide, trimethylammonium hydroxide. Other compounds which can be employed are nitrogen bases such as the salts of guanidine, pyridine, quinoline, quaternary ammonium hydroxides, amines, etc.

A wide variety of rare earth compounds can be employed with facility as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malanates, oxalates, palmitates, hydroxides, tartrates, and the like. The only limitation on the particular rare earth metal salt or salts employed is that it be sufficiently soluble in the fluid medium in which it is used to give the necessary rare earth ion transfer. The preferred rare earth salts are the chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rate earth metal salts employed can either be the salt of a single rare earth metal or mixtures of rare earth metals, such as rare earth chlorides of didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

Aluminosilicates which are treated with a fluid medium or media in the manner above described include a wide variety of aluminosilicates both natural and synthetic which have an amorphous, crystalline or combination of crystalline and amorphous structure. However, it has been found that exceptionally superior catalysts can be obtained when the starting aluminosilicate has either a crystalline or a combination of crystalline and amorphous structure and possesses at least 0.4 and preferably 0.6 to 1.0 equivalent of metal cations per gram atom of aluminum. The aluminosilicates can be described as a three-dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the aluminosilicates may be represented by the formula:

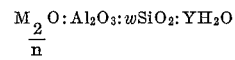
$$\frac{M_2}{n}O : Al_2O_3 : wSiO_2 : YH_2O$$

wherein M represents at least one cation which balances the electrovalence of the tetrahedra, $n$ represents the valence of the cation, $w$ the moles of $SiO_2$ and Y the moles of $H_2O$. The cation can be any or more of a number of metal ions, depending upon whether the aluminosilicate is synthesized or occurs naturally.

Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Aluminosilicates falling within the above formula are well known and include synthesized aluminosilicates, natural aluminosilicates, and certain caustic treated clays. Among the preferred aluminosilicates one can include Zeolites A, Y, L, D, R, S, T, Z, E, F, Q, B, X, levynite, dachiarite, erionite, faujasite, analcite, paulingite, noselite, phillipsite, brewsterite, flakite, datolite, chabazite, gmelinite, leucite, scapolite, mordenite as well as certain caustic treated clays such as montmorillonite and kaolin families. The particularly preferred aluminosilicates are those having pore diameters of at least about 4 Angstroms.

Other synthesized crystalline aluminosilicates include those designated at ZK–4, Zeolite α and ZK–5.

ZK–4 can be represented in terms of mole ratios of oxides as:

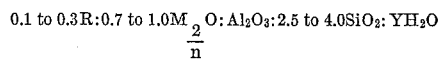
$$0.1 \text{ to } 0.3R : 0.7 \text{ to } 1.0 \frac{M_2}{n}O : Al_2O_3 : 2.5 \text{ to } 4.0SiO_2 : YH_2O$$

wherein R is a member selected from the group consisting of methylammonium oxide, hydrogen oxide and mixtures thereof with one another, M is a metal cation of $n$ valence, and Y is any value from about 3.5 to 5.5. As synthesized, Zeolite ZK–4 contains primary sodium cations and can be represented by unit cell formula:

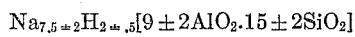
$$Na_{7.5\pm2}H_{2\pm.5}[9\pm2AlO_2.15\pm2SiO_2]$$

The major lines of the X-ray diffraction patterns of ZK-4 are set forth in Table I below:

TABLE I

| d Value of Reflection in A. | 100 I/I$_0$ |
|---|---|
| 12.00 | 100 |
| 9.12 | 29 |
| 9.578 | 73 |
| 7.035 | 52 |
| 6.358 | 15 |
| 5.426 | 23 |
| 4.262 | 11 |
| 4.962 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.900 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK-4 can be prepared by preparing an aqueous solution of oxides containing as $Na_2O$, $Al_2O_3$, $SiO_2$, $H_2O$ and tetramethylammonium ion having a composition, in terms of oxide mole ratios, which falls within the following ranges:

$SiO_2/Al_2O_3$ .................................. 2.5 to 11
$\dfrac{Na_2O}{Na_2O+[(CH_3)_4N]_2O}$ ............ 0.05 to 0.25
$\dfrac{H_2O}{Na_2O+[(CH_3)_4N]_2O}$ ............. 25 to 50
$\dfrac{Na_2O+[(CH_3)_4N]_2O}{SiO_2}$ ........... 1 to 2 maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

Zeolite α can be represented in terms of mole ratios of oxides as follows:

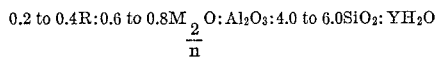

$$0.2 \text{ to } 0.4R : 0.6 \text{ to } 0.8 M_{\frac{2}{n}}O : Al_2O_3 : 4.0 \text{ to } 6.0 SiO_2 : Y H_2O$$

wherein R is a member selected from the group consisting of methylammonium oxide, hydrogen and mixtures thereof, M is a metal cation of n valence and Y the moles of $H_2O$.

Zeolite α is prepared in a similar manner as ZK-4 with the exception that mole ratio of silica to alumina is at least 20 to 1, the mole ratio of $[(CH_3)_4N]_2O$ to $Na_2O$ is about 10 to 1 and the forming temperature is about 60 to 90° C.

ZK-5 can be represented by composition in terms of mole ratios of oxides as:

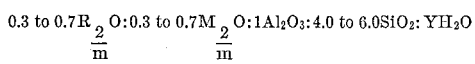

$$0.3 \text{ to } 0.7 R_{\frac{2}{m}} O : 0.3 \text{ to } 0.7 M_{\frac{2}{m}} O : 1 Al_2O_3 : 4.0 \text{ to } 6.0 SiO_2 : Y H_2O$$

wherein R is selected from the group consisting of a nitrogen-containing cation derived from N,N'-dimethyltriethylenediammonium ion and mixtures of said cation with hydrogen and m is the valence thereof; M is a metal and n the valence thereof and Y is any value from about 6 to about 10.

The major lines of the X-ray diffraction pattern of ZK-5 are set forth in Table II below. In obtaining the X-ray diffraction powder patterns, standard techniques were employed. The radiation was the KαC doublet of copper, and a Geiger counter spectrometer with a strip chart pen recorder was used. The peak heights, I, and the positions as a function of 2θ, where θ is the Bragg angle, were read from the spectrometer chart. From these, the relative intensities, $100I/I_0$ where $I_0$ is the intensity of the strongest line or peak, and d(obs.), the interplanar spacing in A., corresponding to the recorded lines were calculated.

Table II

| hkl | I/I$_0$×100 | d, A. |
|---|---|---|
| 110 | 18 | 13.3 |
| 200 | 100 | 9.41 |
| 220 | 6 | 6.62 |
| 310 | 41 | 5.93 |
| 222 | 48 | 5.41 |
| 321 | 2 | 5.03 |
| 400 | 6 | 4.69 |
| 330 | 50 | 4.41 |
| 420 | 34 | 4.19 |
| 332 | 22 | 3.98 |
| 422 | 18 | 3.81 |
| 510 | 6 | 3.66 |
| 521 | 13 | 3.41 |
| 530, 433 | 35 | 3.21 |
| 611 | 28 | 2.02 |
| 620 | 21 | 2.94 |
| 541 | 2 | 2.88 |
| 622 | 26 | 2.81 |
| 631 | 9 | 2.75 |
| 543, 710, 550 | 11 | 2.64 |
| 640 | 2 | 2.59 |
| 721, 633, 552 | 9 | 2.54 |
| 730 | 3 | 2.45 |
| 732, 651 | 1 | 2.37 |
| 811, 741, 554 | 2 | 2.30 |
| 822, 660 | 3 | 2.20 |
| 831, 750, 743 | 2 | 2.17 |
| 662 | 1 | 2.14 |
| 910, 833 | 3 | 2.06 |
| 842 | 2 | 2.04 |
| 921, 761, 655 | 3 | 2.02 |
| 830, 851, 754 | ½ | 1.97 |
| 932, 763 | 2 | 1.93 |
| 941, 853, 770 | 2 | 1.89 |
| 10, 000, 860 | 5 | 1.87 |
| 10, 2, 0, 862 | 5 | 1.83 |
| 10, 3, 1, 952, 765 | 5 | 1.79 |

ZK-5 can be prepared by preparing an aqueous solution of oxides containing $Na_2O$, $Al_2O_3$, $SiO_2$, $H_2O$ and N,N'-dimethyltriethylenediammonium ion having a composition, in terms of oxide mole ratios, which falls within the following ranges:

$SiO_2Al_2O_3$ .................. Of from about 2.5 to 15.
$\dfrac{Na_2O}{Na_2O+C_8H_{18}N_2O}$ .... Of from about 0.01 to 0.25.
$\dfrac{H_2O}{Na_2O+C_8H_{18}N_2O}$ ..... Of from about 25 to 50.
$\dfrac{Na_2O+C_8H_{18}N_2O}{SiO_2}$ .... Of from about 1 to 2.

maintaining the mixture at a temperature of about 90° C. to 120° C. until the crystals are formed, and separating the crystals from the mother liquor. The crystal material is thereafter washed until the wash effluent has a pH essentially that of wash water and subsequently dried.

Other aluminosilicates which can be used are caustic treated clays.

Of the clay materials, montmorillonite and kaolin families are representative types which include the sub-bentonites, such as bentonite, and the kaolins commonly identified as Dixie, McNamee, Georgia, and Florida clays in which the main mineral constituent is halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling with the following weight ratios:

$Na_2O$/clay (dry basis) _____ 1.0–6.6 to 1
$SiO_2$/clay (dry basis) _____ 0.01–3.7 to 1
$H_2O$/$Na_2O$ (mole ratio) _____ 35–100 to 1

It is to be understood that mixtures of the various aluminosilicates previously set forth can be employed as well as individual aluminosilicates.

In another embodiment of this invention, the active aluminosilicate component prepared in the foregoing manner is combined, dispersed or otherwise intimately admixed with a porous matrix in such proportions that the resulting product contains from about 1 to 95% by weight, and preferably from about 2 to 80% by weight, of the aluminosilicate in the final composite. The incorporation of the aluminosilicate into the porous matrix can be accomplished either before, after, or during treatment with the fluid medium or media. Thus, it is possible to treat an aluminosilicate with one fluid medium, e.g., one containing rare earth cations, incorporate the treated aluminosilicate into a porous matrix, and then further treat the resulting composition with another fluid medium containing hydrogen ions, hydrogen precursors or mixtures thereof; as well as treating an aluminosilicate with any of the fluid medium or media previously set forth either before or after incorporation of the aluminosilicate into a porous matrix.

The term "porous matrix" includes organic and/or inorganic compositions with which the aluminosilicate can be combined, dispersed or otherwise intimately admixed wherein the matrix may be active or inactive. It is to be understood that porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, activated charcoal, refractory oxides, organic resins, such as polyepoxides, polyamines, polyesters, vinyl resins, phenolics, amino resins, melamines, acrylics, alkyds, epoxy resins, etc., and inorganic oxide gels. Of these matrices, the inorganic oxide gels are particularly preferred because of their superior porosite, attrition resistance, and stability under reaction conditions, especially those reaction conditions encountered in the cracking of gas oil.

The aluminosilicate-inorganic oxide gel compositions can be prepared by several methods wherein the aluminosilicate is reduced to a particle size less than 40 microns, preferably within the range of 1 to 10 microns, and intimately admixed with an inorganic oxide gel while the latter is in a hydrous state such as in the form of a hydrosol, hydrogel, wet gelatinous precipitate or a mixture thereof. Thus, finely divided active aluminosilicates can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Patent 2,384,946. The aluminosilicate-siliceous gel thus obtained is washed free of soluble salts and thereafter dried and/or calcined as desired. The total alkali metal content of the resulting composite, including alkali metals which may be present in the aluminosilicate as an impurity, is less than about 4 percent and preferably less than about 3 percent by weight based on the total composition. If an inorganic oxide gel matrix is employed having too high an alkali metal content, the alkali metal content can be reduced by treatment with the fluid media previously set forth either before or after drying.

In a like manner, the active aluminosilicate may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel or wet gelatinous precipitate or hydrous oxide.

The inorganic oxide gel may also consist of a semiplastic or plastic clay mineral. The aluminosilicate can be incorporated in the clay simply by blending the two and fashioning the mixture into desired shapes. Suitable clays include attapulgite, kaolin, sepiolite, polygarskite, kaolinite, plastic ball clays, bentonite, montmorillonite, illite, chlorite, etc.

The inorganic oxide gel may also consist of a plural gel comprising a predominant amount of silica with one or more metals or oxides thereof selected from Groups IB, II, III, IV, V, VI, VII and VIII of the Periodic Table. Particular preference is given to plural gels of silica with metal oxides of Groups IIA, III and IVA of the Periodic Table, especially wherein the metal oxide is magnesia, rare earth oxide, alumina, zirconia, titania, beryllia, thoria or combinations thereof. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters or other materials which may be present in the composition include cerium, chromium, cobalt, tungsten, uranium, platinum, lead, zinc, calcium, magnesium, barium, lithium, nickel and their compounds as well as silica, alumina, silica alumina, or other siliceous oxide combinations as fines in amounts ranging from 5 to 40 percent by weight based on the finished catalyst.

Other preferred matrices include powdered metals, such as aluminum, stainless steel, and powders of refractory oxides, such as α alumina, etc., having very low internal pore volume. These materials have substantially no inherent catalytic activity of their own.

As has heretofore been pointed out, the novel catalysts of this invention are aluminosilicates containing both hydrogen ions or ions capable of conversion to hydrogen ions and rare earth metal cations with the only limitation being that in no instance should there be any more than 0.25 equivalent per gram atom of aluminum of alkali metal associated with the aluminosilicate.

Within the above limits of the novel catalyst compositions of this invention, it is preferred that there be a minimum amount of alkali metal cations associated therewith since the presence of these metals tends to suppress or limit catalytic properties, the activity of which, as a general rule, decreases with increasing content of alkali metal cations. It is also preferred that the novel compositions have at least 0.4 and more desirably 0.6 to 1.0 equivalent per gram atom of aluminum of positive ions of which at least some are rare earth metal cations and hydrogen ions capable of conversion to hydrogen ions. Additionally, in those situations wherein the catalyst composition contains metallic cations other than rare earth metal cations, it is then preferred that they be at least divalent with the cations of divalent metals, such as calcium, magnesium, and manganese being particularly advantageous. Polyvalent metallic ions capable of reduction to lower valence states are also particularly advantageous for dual function catalysts.

A more preferred embodiment of this invention resides in those catalyst compositions which have from 0.5 to 1.0 equivalent per gram atom of aluminum of positive ions consisting of hydrogen ions or ions capable of conversion to hydrogen ions and rare earth metal cations. Thus, in the most preferred embodiment of this invention, rare earth metal cations are substantially the only metallic cations associated with the aluminosilicate.

The relative amount of hydrogen ions, or ions capable of conversion to hydrogen ions, to rare earth ions associated with the compositions of the instant invention is not narrowly critical and can vary over a fairly wide range. However, particularly effective catalysts are obtained when the rare earth content ranges from 10 to 95% of the total equivalents of positive ion with 25 to 85% being preferred and 40 to 85% being particularly preferred.

Therefore, the most preferred embodiment of this invention resides in those compositions having from 0.6 to 1.0 equivalent of ions of positive valence consisting of both hydrogen ions or ions capable of conversion to hydrogen ions and rare earth metal cations of which 40 to 85% of the total equivalents are represented by rare earth metal cations, and even more desirably by cations of lanthanum, praseodymium, samarium, gadolinium, neodymium or mixtures predominating in one or more of the above.

While not wishing to be bound by any theory of operation, it nevertheless appears that the rare earth cations tend to impart stability to the aluminosilicate composiions, thereby rendering them far more useful for catalytic purposes, particularly in hydrocarbon conversion processes such as cracking. For reasons not completely understood, rare earth cations are extremely superior in this regard to all other metallic cations, especially when associated with hydrogen ions or hydrogen ion precursors. It is to be understood that the degree of stability imparted will generally vary as to the amount of rare earth cations associated with a particular aluminosilicate whereas the stability needed will obviously vary as to the particular reaction which is being catalyzed.

The catalysts of this invention may be used in powdered, granular or molded state formed into spheres or pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

It is to be understood that the active aluminosilicate can also be calcined prior to incorporation into the porous matrix.

It has been further found in accordance with the invention that catalysts of improved selectivity and having other beneficial properties in some hydrocarbon conversion, e.g., gas oil cracking, are obtained by subjecting the catalyst product to a mild steam treatment carried out at elevated temperatures of 800° F. to 1500° F. and preferably at temperatures of about 1000° F. to 1400° F. The treatment may be accomplished in an atmosphere of 100 percent steam or in atmosphere consisting of steam and a gas which is substantially inert to the aluminosilicate. The steam treatment apparently provides beneficial properties in the aluminosilicate compositions and can be conducted before, after or in place of the calcination treatment.

A similar treatment can be accomplished at lower temperatures and elevated pressures, e.g., 350–700° F. at 10 to about 200 atmospheres.

The high catalytic activities obtained by aluminosilicate compositions prepared in accordance with the invention are illustrated in connection with the cracking of a representative hydrocarbon charge. In the examples hereinafter set forth, the reference catalyst employed consisted of a conventional silica-alumina "bead" type cracking catalyst. The silica-alumina catalyst contained about 10 weight percent $Al_2O_3$ and the remainder $SiO_2$. In some instances, it also contained a trace amount of $Cr_2O_3$, i.e., about 0.15 weight percent.

The cracking activity of the catalyst is further illustrated by its ability to catalyze the conversion of a Mid-Continent gas oil having a boiling range of 450–950° F. to gasoline having an end point of 410° F. Vapors of the gas oil are passed through the catalyst at temperatures of 875° F. or 900° F. substantially at atmospheric pressure at a feed rate of 1.5 to 8.0 volumes of liquid oil per volume of catalyst per hour for ten minutes. The method of measuring the instant catalyst was to compare the various product yields obtained with such catalyst with yields of the same products given by conventional silica-alumina catalyst at the same conversion level. The differences (Δ values) shown hereinafter represent the yields given by the present catalyst minus yields given by the conventional catalyst. In these tests, the catalyst compositions of the invention were precalcined at about 1000° F. prior to their evaluation as a cracking catalyst.

The catalysts prepared in accordance with the invention find extensive utility in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, hydrocracking, oxidation, polymerization and the like. The catalysts are exceptionally stable and are particularly useful in such of the above and related processes carried out at temperatures ranging from ambient temperatures of 70° F. up to 1400° F. including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

By way of example, the dehydrogenation of hydrocarbons such as propane, butylene, butane, pentane, cyclopentane, cyclohexane, methyl cyclohexane and the like, can be carried out at temperatures ranging from about 300° F. to 1025° F. under atmospheric or superatmospheric pressures with a space velocity (LHSV) from 0.2 to 5000. For dehydrogenation, metals and oxides and sulfides of metals such as platinum, palladium, rhodium, tungsten, iron, copper or nickel can be employed as promoters with the active aluminosilicate.

For the desulfurization of hydrocarbons, which involves largely hydrogenation, the oxides and sulfides of such metals as cobalt, molybdenum, chromium, iron, manganese, vanadium, copper and mixtures thereof may be used in conjunction with the aluminosilicate. Desulfurization of shale distillates and the like may be carried out at temperatures between about 600° F. and 1000° F. under atmospheric or superatmospheric pressures with a space velocity (LHSV) between 0.2 and 50. The specific conditions within these ranges will vary with the feed stock undergoing desulfurization and the product desired.

The catalysts of the invention can be employed for hydrogenation of unsaturated aliphatic hydrocarbons, such as mono-olefins, diolefins, etc., to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 1000° F. under a pressure of about 10 to 3000 pounds p.s.i. or more, at a space velocity (LHSV) from about 0.5 to 5.0. The promoters which are normally employed with the aluminosilicate include the oxides of nickel, copper and iron and platinum group metals.

Hydrocracking of heavy petroleum residual stocks, cycle stocks, etc., may be carried out with active aluminosilicates prompted with about 0.05 to 10 percent by weight of a platinum metal such as platinum, palladium, rhodium, osmium, iridium and ruthenium. The petroleum feed stock is cracked in the presence of the catalyst at temperatures between 400° F. and 825° F. using molar ratios of hydrogen to hydrocarbon charge in a range between 2 and 80. The pressure employed will vary between 10 and 2500 p.s.i.g. and the space velocity between 0.1 and 10.

The catalysts of the invention may be further utilized for the alkylation of aromatic hydrocarbons of phenols and the conversion of olefinic, acetylenic and naphthenic hydrocarbons. Alkylation of aromatics and phenols may be carried out at temperatures between 15° and 850° F. under pressures of 0 to 1000 p.s.i.g. The aromatizing reaction may be effected at temperatures between 350° F. and 1100° F. under atmospheric or elevated pressures. Other reactions which the catalysts find utility include isomerization, polymerization, hydrogen transfer, oxidation of olefins to form the corresponding oxide, such as ethylene to ethylene oxide, propylene to propylene oxide, etc., as well as the oxidation of alcohol and ketones, etc. The catalyst composition of the invention also finds utility in processes for the oxidation of cyclohexane to adipic acid through the precursors cyclohexanone and cyclohexanol, as well as in the manufacture of caprolactam from caprolactone and ammonia. Additionally, the catalyst composites of the invention may be useful catalytically in processes for the production of vinyl chloride by oxidative-dehydrogenation reactions involving ethane and hydrogen chloride.

This application is a continuation-in-part of applications Serial No. 42,284, filed July 12, 1960; Serial Nos. 215,272 and 215,291, filed August 7, 1962, now abandoned.

The following examples illustrate the best mode now contemplated for carrying out the invention.

*Example 1*

A synthetic crystalline aluminosilicate identified as Zeolite 13X was subjected to 12 two-hour treatments at 180° F. with an aqueous solution containing 5 percent by weight mixture of rare earth chlorides and 2 percent by weight of ammonium chloride. The aluminosilicate was then washed with water until there were no chloride ions in the effluent, dried, and then treated for 20 hours at 1225° F. with 100 percent atmospheric steam to yield a catalyst having a sodium content of 0.31 weight percent and a rare earth content determined as rare earth oxides of 23.5 percent by weight.

The following table shows the cracking data obtained when the catalyst was evaluated for cracking gas oil at 900° F.

TABLE

Cracking data:
| | |
|---|---|
| Conversion, vol. percent | 60.9 |
| LHSV | 16 |
| 10 R.V.P. gaso., vol. percent | 54.6 |
| Excess $C_4$'s, vol. percent | 9.5 |
| $C_5+$ gasoline, vol. percent | 51.7 |
| Total $C_4$'s, vol. percent | 12.5 |
| Dry gas, wt. percent | 5.6 |
| Coke, wt. percent | 2.3 |
| $H_2$, wt. percent | 0.02 |

Δ advantage:
| | |
|---|---|
| 10 R.V.P., vol. percent | +9.3 |
| Excess $C_4$'s, vol. percent | −4.5 |
| $C_5+$ gasoline, vol. percent | +7.4 |
| Total $C_4$'s, vol. percent | −3.7 |
| Dry gas, wt. percent | −2.2 |
| Coke, wt. percent | −2.4 |

*Example 2*

The procedure of Example 1 was repeated with the exception that the crystalline aluminosilicate was subjected to a continuous treatment for 24 hours instead of 12 two-hour treatments. The following table shows the cracking data obtained when the catalyst was evaluated for cracking gas oil at 900° F.:

TABLE

Cracking data:
| | |
|---|---|
| Conversion, vol. percent | 60.7 |
| LHSV | 16 |
| 10 R.V.P. gaso., vol. percent | 51.7 |
| Excess $C_4$'s, vol. percent | 11.2 |
| $C_5+$ gasoline, vol. percent | 49.2 |
| Total $C_4$'s, vol. percent | 13.7 |
| Dry gas, wt. percent | 6.4 |
| Coke, wt. percent | 3.0 |
| $H_2$, wt. percent | 0.03 |

Δ advantage:
| | |
|---|---|
| 10 R.V.P. gaso., vol. percent | +6.5 |
| Excess $C_4$'s, vol. percent | −2.8 |
| $C_5+$ gasoline, vol. percent | +6.2 |
| Total $C_4$'s, vol. percent | −2.5 |
| Dry gas, wt. percent | −1.3 |
| Coke, wt. percent | −1.7 |

*Example 3*

A crystalline aluminosilicate identified as Zeolite 13X was subjected to three two-hour treatments with a 5 percent by weight aqueous solution of ammonium chloride and then treated for 48 hours with an aqueous solution consisting of 5 percent by weight mixture of rare earth chlorides and 2 percent by weight of ammonium chloride. The aluminosilicate was then washed with water until there were no chloride ions in the effluent, dried and then treated for 24 hours at 1200° F. with steam at 15 p.s.i.g. to yield a catalyst having a sodium content of 0.2 weight percent.

*Example 4*

A synthetic crystalline aluminosilicate identified as Zeolite 13X was treated for 72 continuous hours with an aqueous solution containing 10 percent by weight of ammonium chloride, 1.0 percent by weight of ammonium acetate, and 1 percent by weight of rare earth chlorides. The aluminosilicate was then washed with water until there were no chloride or acetate ions in the effluent, dried and then treated for 24 hours at 1200° F. with steam at a pressure of 15 p.s.i.g. to yield a composition having a rare earth content, determined as rare earth oxides, at 22.0 weight percent.

The following table shows the cracking data obtained when the catalyst was evaluated for cracking gas oil at 900° F.

TABLE

Cracking data:
- Conversion, vol. percent _____ 56.6
- LHSV _____ 16.0
- 10 R.V.P. gaso., vol. percent _____ 50.9
- Excess C$_4$'s, vol. percent _____ 9.2
- C$_5$+ gasoline, vol. percent _____ 48.3
- Total C$_4$'s, vol. percent _____ 11.8
- Dry gas, wt. percent _____ 5.4
- Coke, wt. percent _____ 1.4
- H$_2$, wt. percent _____ 0.01

Δ advantage:
- 10 R.V.P. gasol., vol. percent _____ +7.9
- Excess C$_4$'s, vol. percent _____ −3.4
- C$_5$+ gasoline, vol. percent _____ +7.4
- Total C$_4$'s, vol. percent _____ −3.0
- Dry gas, wt. percent _____ −1.6
- Coke, wt. percent _____ −2.5

*Example 5*

A synthetic crystalline aluminosilicate identified as Zeolite 13X was subjected to 24 two-hour treatments with an aqueous solution consisting of 5 percent by weight of lanthanum chloride and 2 percent by weight of ammonium chloride at 180° F. The aluminosilicate was then washed with water until there were no chloride ions in the effluent, dried and then treated for 20 hours at 1225° F. with 100 percent atmospheric steam to yield a catalyst having a sodium content of 0.36 weight percent, and a rare earth content determined as rare earth oxides, of 26.2 percent by weight.

The following table shows the cracking data obtained when the catalyst was evaluated for cracking gas oil at 900° F.

TABLE

Cracking data:
- Conversion, vol. percent _____ 63.1
- LHSV _____ 16
- 10 R.V.P. gaso., vol. percent _____ 52.6
- Excess C$_4$'s, vol. percent _____ 12.3
- C$_5$+ gasoline, vol. percent _____ 50.4
- Total C$_4$'s, vol. percent _____ 14.5
- Dry gas, wt. percent _____ 6.8
- Coke, wt. percent _____ 3.6
- H$_2$, wt. percent _____ 0.04

Δ advantage:
- 10 R.V.P., vol. percent _____ +6.2
- Excess C$_4$'s, vol. percent _____ −2.7
- C$_5$+ gasoline, vol. percent _____ +6.2
- Total C$_4$'s, vol. percent _____ −2.5
- Dry gas, wt. percent _____ −1.4
- Coke, wt. percent _____ −1.5

*Example 6*

The procedure of Example 5 was repeated with the exception that the aluminosilicate was steamed for 24 hours at 1200° F. with steam at 15 p.s.i.g. The cracking data obtained when using this catalyst for cracking gas oil at 900° F. is shown in the following table.

TABLE

Cracking data:
- Conversion, vol. percent _____ 65.9
- LHSV _____ 16
- 10 R.V.P. gaso., vol. percent _____ 56.5
- Excess C$_4$'s, vol. percent _____ 12.1
- C$_5$+ gasoline, vol. percent _____ 53.9
- Total C$_4$'s, vol. percent _____ 14.7
- Dry gas, wt. percent _____ 6.6
- Coke, wt. percent _____ 3.0
- H$_2$, wt. percent _____ 0.03

Δ advantage:
- 10 R.V.P., vol. percent _____ +8.8
- Excess C$_4$'s, vol. percent _____ −3.9
- C$_5$+ gasoline, vol. percent _____ +8.4
- Total C$_4$'s, vol. percent _____ −3.3
- Dry gas, wt. percent _____ −2.1
- Coke, wt. percent _____ −2.7

*Example 7*

The procedure of Example 6 was repeated with the exception that the equivalent of 36 two-hour contacts of the lanthanum chloride and ammonium chloride solution was employed instead of 24 two-hour contacts. The resulting catalyst had a sodium content of 0.46 weight percent. The following table shows the cracking data obtained when the catalyst was evaluated for cracking gas oil at 900° F.

TABLE

Cracking data:
- Conversion, vol. percent _____ 63.7
- LHSV _____ 16
- 10 R.V.P. gaso., vol. percent _____ 55.3
- Excess C$_4$'s, vol. percent _____ 8.1
- C$_5$+ gasoline, vol. percent _____ 51.8
- Total C$_4$'s, vol. percent _____ 11.6
- Dry gas, wt. percent _____ 7.6
- Coke, wt. percent _____ 3.1
- H$_2$, wt. percent _____ 0.03

Δ advantage:
- 10 R.V.P., vol. percent _____ +8.7
- Excess C$_4$'s, vol. percent _____ −7.0
- C$_5$+ gasoline, vol. percent _____ +7.3
- Total C$_4$'s, vol. percent _____ −5.7
- Dry gas, wt. percent _____ −0.7
- Coke, wt. percent _____ −2.2

*Example 8*

A commercial synthetic aluminosilicate identified as sodium mordenite was treated with a combined aqueous solution of a 5 percent by weight mixture of rare earth chlorides and a 2 percent by weight of ammonium chloride at 180° F. The composition was then washed free of chloride ions, dried at 230° F. in air, and then calcined for 10 hours at 1000° F. to yield a catalyst having a sodium content of 0.19 weight percent and a rare earth oxide content of 3.0 weight percent.

*Example 9*

A synthetic crystalline aluminosilicate identified as XY aluminosilicate, prepared by reacting a bead hydrogel in a caustic solution was treated with an aqueous solution consisting of 5% by weight mixture of rare earth chlorides and 2% by weight of ammonium chloride and then washed with water until the effluent contained no chloride ions, dried and then treated for 24 hours at 1200° F. with 15 p.s.i.g. steam. The resulting aluminosilicate contained 0.52 weight percent sodium and gave the following results when tested for cracking gas oil at 900° F.

TABLE

Cracking data:
- Conversion, vol. percent _____ 61.6
- LHSV _____ 16
- 10 R.V.P. gaso., vol. percent _____ 54.9
- Excess C$_4$'s, vol. percent _____ 9.8
- C$_5$+ gasoline, vol. percent _____ 52.1
- Total C$_4$'s, vol. percent _____ 12.5
- Dry gas, wt. percent _____ 6.1
- Coke, wt. percent _____ 1.9
- H$_2$, wt. percent _____ 0.02

Δ advantage:
- 10 R.V.P., vol. percent _____ +9.0
- Excess C$_4$'s, vol. percent _____ −4.6
- C$_5$+ gasoline, vol. percent _____ +8.6
- Total C$_4$'s, vol. percent _____ −4.1
- Dry gas, wt. percent _____ −1.8
- Coke, wt. percent _____ −2.9

Example 10

The procedure of Example 9 was repeated with the exception that the aluminosilicate was Zeolite Y and the treating solution consisted of 5 percent by weight of lanthanum chloride and 2 percent by weight of ammonium chloride. The resulting aluminosilicate contained 1.2 weight percent sodium and 17.0 weight percent rare earth oxides. The catalytic evalution for cracking gas oil at 900° F. is shown in the following table:

TABLE

Cracking data:
    Conversion, vol. percent _____ 66.1
    LHSV _____ 16
    10 R.V.P. gaso., vol. percent _____ 59.0
    Excess $C_4$'s, vol. percent _____ 9.3
    $C_5$+gasoline, vol. percent _____ 55.7
    Total $C_4$'s, vol. percent _____ 12.6
    Dry gas, wt. percent _____ 7.0
    Coke, wt. percent _____ 2.3
    $H_2$, wt. percent _____ 0.02

Δ advantage:
    10 R.V.P., vol. percent _____ +11.2
    Excess $C_4$'s, vol. percent _____ − 6.9
    $C_5$+gasoline, vol. percent _____ +10.1
    Total $C_4$'s, vol. percent _____ − 5.7
    Dry gas, wt. percent _____ − 1.7
    Coke, wt. percent _____ − 3.4

Example 11

1800 grams of a crystalline aluminosilicate identified as Zeolite 13X were treated with a solution consisting of cerium chloride and ammonium hydroxide. The treatment was carried out at a temperature of 160–180° F. for half-an-hour after which time the slurry was filtered and then the operation repeated for another half-hour. The resulting aluminosilicate contained 0.81 weight percent sodium and 24.7 weight percent cerium.

Example 12

A natural crystalline aluminosilicate identified as gmelinite was crushed to a particle size of less than 32 mesh and calcined in air for 2 hours at 650° F. 5 grams of the calcined crushed gmelinite were treated 10 times with 10 cc. of a solution containing 4 percent by weight mixture of rare earth chlorides and 1 percent by weight ammonium chloride. Each of the treatments was for 1 hour at a temperature of 173–186° F. The aluminosilicate was then washed with water until the effluent contained no chloride ions, dried, overnight at 190° F., pelleted, recrushed to a particle size of less than 12 mesh and calcined for three hours at 900° F. in air. The resulting product was employed as a catalyst for the cracking of decane at a catalyst concentration of 3.3 cc. at a feed rate of 3.0 LHSV, and a temperature of 900° F. A conversion of 91.6 percent by weight was obtained.

Example 13

The procedure of Example 12 was repeated with the exception that ptilolite was employed instead of gmelinite. When the resulting catalyst was used to crack decane, it gave a conversion of 58.7 percent by weight.

Example 14

The procedure of Example 12 was repeated with the exception that the aluminosilicate employed was identified as chabazite. The resulting catalyst gave a conversion of 95% by weight when employed to crack decane.

Example 15

A synthetic crystalline aluminosilicate, identified as Zeolite 13X was subjected to 12 two-hour treatments at 180° F. with an aqueous solution containing 5 percent by weight mixture of rare earth chlorides and 2 percent by weight of ammonium chloride. The aluminosilicate was then treated with a 10 percent by weight aqueous solution of ammonium carbonate for 4 hours at 180° F. The resulting modified aluminosilicate was then washed with water until there were no chloride or carbonate ions in the effluent, dried and then treated for 24 hours at 1200° F. with steam at 15 p.s.i.g. to yield a catalyst having a sodium content of 0.65 weight percent.

The following table shows the cracking data obtained when the catalyst was evaluated for cracking gas oil at 900° F.

TABLE

Cracking data:
    Conversion, vol. percent _____ 43.4
    LHSV _____ 4
    10 R.V.P. gaso., vol. percent _____ 40.9
    Excess $C_4$'s, vol. percent _____ 5.8
    $C_5$+gasoline, vol. percent _____ 38.6
    Total $C_4$'s, vol. percent _____ 8.2
    Dry gas, wt. percent _____ 3.6
    Coke, wt. percent _____ 0.9
    $H_2$, wt. percent _____ 0.02

Δ advantage:
    10 R.V.P., vol. percent _____ +5.1
    Excess $C_4$'s, vol. percent _____ −2.9
    $C_5$+gasoline, vol. percent _____ +5.1
    Total $C_4$'s, vol. percent _____ −2.8
    Dry gas, wt. percent _____ −1.3
    Coke, wt. percent _____ −1.2

Example 16

The procedure of Example 15 was repeated with the exception that a 10 percent by weight aqueous solution of ammonium phosphate was employed instead of the ammonium carbonate. The resulting catalyst had a sodium content of 0.5 weight percent and the cracking data shown in the following table when used at 900° F.

TABLE

Cracking data:
    Conversion, vol. percent _____ 42.2
    LHSV _____ 16
    10 R.V.P. gaso., vol. percent _____ 35.1
    Excess $C_4$'s, vol. percent _____ 7.7
    $C_5$+gasoline, vol. percent _____ 33.5
    Total $C_4$'s, vol. percent _____ 9.3
    Dry gas, wt. percent _____ 4.7
    Coke, wt. percent _____ 2.1
    $H_2$, wt. percent _____ 0.02

The following examples illustrate the use of clays which have been treated with caustic in admixture with a source of silica, such as sand, silica gel or sodium silicate, calcined at temperatures ranging from 230° F. to 1600° F., crushed, dispersed in water and digested.

Example 17

McNamee clay,[1] an aluminosilicate which had been caustic treated, was subjected to treatment with an aqueous solution consisting of 5 percent by weight mixture of rare earth chlorides and 2 percent by weight ammonium chloride. The aluminosilicate was then washed with water until the effluent contained no chloride ions and treated for 20 hours at 1225° F. with steam at atmospheric pressure. The resulting aluminosilicate was evaluated for cracking gas oil at 900° F. and gave the following results.

---

[1] $Al_2O_3$—39.85 wt. percent, $SiO_2$—44.9 wt. percent, $Fe_2O_3$—0.35 wt. percent, $TiO_2$—0.73 wt. percent, CaO—trace, MgO—trace, $Na_2O$—0.12 wt. percent, $K_2O$—0.10 wt. percent.

TABLE

Cracking data:
- Conversion, vol. percent _____ 57.2
- LHSV _____ 16
- 10 R.V.P. gaso., vol. percent _____ 49.9
- Excess $C_4$'s, vol. percent _____ 9.5
- $C_5+$ gasoline, vol. percent _____ 47.4
- Total $C_4$'s, vol. percent _____ 12.0
- Dry Gas, wt. percent _____ 5.6
- Coke, wt. percent _____ 2.8
- $H_2$, wt. percent _____ 0.05

Δ advantage:
- 10 R.V.P., vol. percent _____ +6.5
- Excess $C_4$'s, vol. percent _____ −3.2
- $C_5+$ gasoline, vol. percent _____ +6.2
- Total $C_4$'s, vol. percent _____ −3.0
- Dry gas, wt. percent _____ −1.6
- Coke, wt. percent _____ −1.2

Example 18

Dixie Clay,[2] an aluminosilicate which had been caustic treated, was treated with an aqueous solution consisting of 5 percent by weight mixture of rare earth chlorides and 2 percent by weight of ammonium chloride for 2 treatments of 24 hours each. The aluminosilicate was then washed with water until the effluent contained no chloride ions, dried and treated with steam for 20 hours at 1225° F. at atmospheric pressure.

The catalytic evaluation of the resulting aluminosilicate for cracking gas oil at 900° F. is shown in the following table:

TABLE

Cracking data:
- Conversion, vol. percent _____ 36.9
- LHSV _____ 10
- 10 R.V.P. gaso., vol. percent _____ 36.2
- Excess $C_4$'s, vol. percent _____ 2.0
- $C_5+$ gasoline, vol. percent _____ 33.7
- Total $C_4$'s, vol. percent _____ 4.5
- Dry gas, wt. percent _____ 3.5
- Coke, wt. percent _____ 1.8
- $H_2$, wt. percent _____ 0.15

Δ advantage:
- 10 R.V.P., vol. percent _____ +4.2
- Excess $C_4$'s, vol. percent _____ −5.0
- $C_5+$ gasoline, vol. percent _____ +4.0
- Total $C_4$'s, vol. percent _____ −4.8
- Dry gas, wt. percent _____ −0.5
- Coke, wt. percent _____ +0.3

Example 19

Bentonite, an aluminosilicate, which had been caustic treated, was treated with an aqueous solution consisting of 5 percent by weight mixture of rare earth chlorides and 2 percent by weight of ammonium chloride. The treated aluminosilicate was then washed with water until there were no chloride ions in the effluent, dried and then treated with steam for 24 hours at 1200° F. at a pressure of 15 p.s.i.g. The resulting aluminosilicate contained 0.2 percent by weight calcium and possessed catalytic properties.

Example 20

A synthetic crystalline aluminosilicate identified as Y aluminosilicate was treated with an aqueous solution consisting of 5 weight percent mixture of rare earth chlorides and 2 weight percent ammonium chloride continuously for 96 hours at 180° F. It was then washed with water until the effluent was free of chloride ions, dried and then treated in air at 1000° F. for 10 hours followed by 24 hours at 1200° F. steam treat with 15 p.s.i.g. steam. The resulting catalyst contained 1.4 weight percent sodium and 16.1 weight percent rare earth oxide. It gave the following results when tested for cracking gas oil at 900° F. and 4 liquid hourly space velocity.

[2] 44.51 wt. percent $Al_2O$, 38.51 wt. percent $SiO$, 1.27 wt. percent $Fe_2O_3$, 1.47 wt. percent $TiO_2$, 0.08 wt. percent $CaO$, 0.12 wt. percent $MgO$, 0.08 wt. percent $Na_2O$.

Catalytic evaluation:
- Conversion, vol. percent _____ 62.4
- 10 R.V.P. gaso., vol. percent _____ 57.0
- Excess $C_4$'s, vol. percent _____ 8.7
- $C_5+$ gasoline, vol. percent _____ 53.7
- Total $C_4$'s, vol. percent _____ 11.9
- Dry gas, wt. percent _____ 5.5
- Coke, wt. percent _____ 2.0
- $H_2$, wt. percent _____ 0.03

Delta advantage over Si/Al:
- 10 R.V.P. gaso., vol. percent _____ +11.0
- Excess $C_4$'s, vol. percent _____ −6.0
- $C_5+$ gasoline, vol. percent _____ +9.8
- Total $C_4$'s, vol. percent _____ −4.9
- Dry gas, wt. percent _____ −3.0
- Coke, wt. percent _____ −2.6

Example 21

5 parts by weight of the synthetic crystalline aluminosilicate identified as Zeolite 13X were incorporated into 95 parts by weight of a silica-alumina matrix consisting of 94 weight percent of $SiO_2$ and 6 weight percent of $Al_2O_3$. The resulting composition was then treated with an aqueous solution containing 1 percent by weight mixture of rare earth chlorides and 1 percent by weight of ammonium chloride for 12 contacts of 2 hours each. The treated aluminosilicate was then washed with water until there were no chloride ions in the effluent, dried and treated for 24 hours at 1200° F. with steam at 15 p.s.i.g. to yield a catalyst having a sodium content of 0.07 weight percent.

The following table shows the cracking data obtained when the catalyst was evaluated for cracking gas oil at 900° F.

TABLE

Cracking data:
- Conversion, vol. percent _____ 50.5
- LHSV _____ 4
- 10 R.V.P. gaso., vol. percent _____ 45.0
- Excess $C_4$'s, vol. percent _____ 8.7
- $C_5+$ gasoline, vol. percent _____ 42.7
- Total $C_4$'s, vol. percent _____ 11.0
- Dry gas, wt. percent _____ 4.7
- Coke, wt. percent _____ 1.6
- $H_2$, wt. percent _____ 0.04

Δ advantage:
- 10 R.V.P., vol. percent _____ +5.1
- Excess $C_4$'s, vol. percent _____ −2.0
- $C_5+$ gasoline, vol. percent _____ +5.2
- Total $C_4$'s, vol. percent _____ −2.0
- Dry gas, wt. percent _____ −1.4
- Coke, wt. percent _____ −1.4

Example 22

The procedure of Example 21 was repeated with the exception that one contact of 24 continuous hours was employed instead of 12 two-hour contacts. The sodium content of the resulting aluminosilicate was 0.1 weight percent and it had the cracking data shown in the following table when employed at a temperature of 900° F.

TABLE

Cracking data:
- Conversion, vol. percent _____ 51.5
- LHSV _____ 4
- 10 R.V.P. gaso., vol. percent _____ 45.8
- Excess $C_4$'s, vol. percent _____ 9.4
- $C_5+$ gasoline, vol. percent _____ 43.5
- Total $C_4$'s, vol. percent _____ 11.7
- Dry gas, wt. percent _____ 4.7
- Coke, wt. percent _____ 1.4
- $H_2$, wt. percent _____ 0.03

Δ advantage:
10 R.V.P., vol. percent _____ +5.3
Excess $C_4$'s, vol. percent _____ —1.6
$C_5+$ gasoline, vol. percent _____ +5.3
Total $C_4$'s, vol. percent _____ —1.6
Dry gas, wt. percent _____ —1.6
Coke, wt. percent _____ —1.7

*Example 23*

25 parts by weight of a crystalline aluminosilicate identified as Zeolite 13X was dispersed in 75 parts by weight of silicon dioxide and the resulting composition treated for 24 continuous hours with an aqueous solution consisting of 1 percent by weight mixture of rare earth chlorides and 1 percent by weight of ammonium chloride. The aluminosilicate was then washed with water, until there were no chloride ions in the effluent, dried and then treated for 24 hours at a temperature of 1200° F. with steam at 15 p.s.i.g. to yield a catalyst having the cracking data shown in the following table when evaluated for cracking gas oil at 900° F.

TABLE
Cracking data:
Conversion, vol. percent _____ 61.5
LHSV _____ 4
10 RVP gaso., vol. percent _____ 53.8
Excess $C_4$'s, vol. percent _____ 9.8
$C_5+$ gasoline, vol. percent _____ 50.9
Total $C_4$'s, vol. percent _____ 12.6
Dry gas, wt. percent _____ 5.9
Coke, wt. percent _____ 3.0
$H_2$, wt. percent _____ 0.02

Δ advantage:
10 R.V.P., vol. percent _____ +8.2
Excess $C_4$'s, vol. percent _____ —4.6
$C_5+$ gasoline, vol. percent _____ +7.5
Total $C_4$'s, vol. percent _____ —3.9
Dry gas, wt. percent _____ —1.9
Coke, wt. percent _____ —1.7

*Example 24*

The procedure of Example 23 was repeated with the exception that the composition was first treated with a 2 percent by weight aqueous solution of a mixture of rare earth chlorides for 16 continuous hours, washed and then treated with a 1 percent by weight aqueous solution of ammonium chloride for 24 continuous hours. The resulting catalyst contained 4.35 weight percent rare earths determined as rare earth oxides, and had the cracking data shown in the following table.

TABLE
Cracking data:
Conversion, vol. percent _____ 48.4
LHSV _____ 4
10 R.V.P. gaso., vol. percent _____ 44.6
Excess $C_4$'s, vol. percent _____ 6.5
$C_5+$ gasoline, vol. percent _____ 42.1
Total $C_4$'s, vol. percent _____ 9.0
Dry gas, wt. percent _____ 4.6
Coke, wt. percent _____ 1.3
$H_2$, wt. percent _____ 0.02

Δ advantage:
10 R.V.P., vol. percent _____ +5.8
Excess $C_4$'s, vol. percent _____ —3.5
$C_5+$ gasoline, vol. percent _____ +5.6
Total $C_4$'s, vol. percent _____ —3.5
Dry gas, wt. percent _____ —1.1
Coke, wt. percent _____ —1.4

*Example 25*

The procedure of Example 24 was repeated with the exception that two 2-hour contacts of a rare earth chloride mixture were employed instead of one 2-hour contact followed by a 24 hour continuous exchange with a mixture of 2% $CaCl_2$ and 1% ammonium chloride. The resulting aluminosilicate had a sodium content of 0.1% by weight, a calcium content of 1.8% by weight, and a rare earth content, determined as rare earth oxides, of 7.7% by weight.

The following table shows the cracking data of a catalyst when evaluated for cracking gas oil at 900° F.:

TABLE
Cracking data:
Conversion, vol. percent _____ 53.7
LHSV _____ 4
10 R.V.P. gaso., vol. percent _____ 46.1
Excess $C_4$'s, vol. percent _____ 9.9
$C_5+$ gasoline, vol. percent _____ 43.9
Total $C_4$'s, vol. percent _____ 12.1
Dry gas, wt. percent _____ 5.1
Coke, wt. percent _____ 2.8

Δ advantage:
10 R.V.P., vol. percent _____ +4.5
Excess $C_4$'s, vol. percent _____ —1.8
$C_5+$ gasoline, vol. percent _____ +4.6
Total $C_4$'s, vol. percent _____ —1.9
Dry gas, wt. percent _____ —1.5
Coke, wt. percent _____ —0.7

*Example 26*

10 parts by weight of a synthetic crystalline aluminosilicate identified as Zeolite 13X was dispersed in 90 parts by weight of a silica alumina matrix consisting of 93% $SiO_2$ and 7% $Al_2O_3$. The composition was then treated for 24 continuous hours with a 1% by weight solution of ammonium chloride. The aluminosilicate was then washed with water until there were no chloride ions in the effluent, dried and then treated for 30 hours at 1200° F. with steam at a pressure of 15 p.s.i.g. to yield a catalyst having a sodium content of 0.09% by weight and a rare earth content, determined as rare earth oxides, of 7.92% by weight.

The following table shows the cracking data of the catalyst when evaluated for cracking gas oil at 900° F.:

TABLE
Cracking data:
Conversion, vol. percent _____ 54.8
LHSV _____ 4
10 R.V.P. gaso., vol. percent _____ 48.3
Excess $C_4$'s, vol. percent _____ 9.1
$C_5+$ gasoline, vol. percent _____ 45.8
Total $C_4$'s, vol. percent _____ 11.5
Dry gas, wt. percent _____ 4.8
Coke, wt. percent _____ 2.5
$H_2$, wt. percent _____ 0.03

Δ advantage:
10 R.V.P., vol. percent _____ +6.1
Excess $C_4$'s, vol. percent _____ —2.9
$C_5+$ gasoline, vol. percent _____ +6.0
Total $C_4$'s, vol. percent _____ —2.7
Dry gas, wt. percent _____ —1.9
Coke, wt. percent _____ —1.1

*Example 27*

10 parts by weight of a synthetic crystalline aluminosilicate identified as Zeolite 13X was dispersed into 90 parts of a silica alumina matrix and the composition was treated with an aqueous solution containing 2% by weight of a mixture of rare earth chlorides for 24 continuous hours. The aluminosilicate was then washed and treated with a 1% by weight aqueous solution of ammonium sulfate for three 16-hour contacts and then for nine 2-hour contacts with the same solution. The aluminosilicate was then washed with water until there were no chloride or sulfate ions in the effluent, dried and then treated for 30 hours at 1200° F. with steam at a pressure of 15 p.s.i.g. to yield a catalyst having a sodium content of 0.17% by weight and a rare earths content, determined as rare earth oxides of 4.5% by weight.

The following table shows the cracking data of the catalyst when evaluated for cracking gas oil at 900° F.:

TABLE

Cracking data:
- Conversion, vol. percent _____ 57.4
- LHSV _____ 4
- 10 R.V.P. gaso., vol. percent _____ 48.3
- Excess $C_4$'s, vol. percent _____ 11.1
- $C_5+$ gasoline, vol. percent _____ 46.2
- Total $C_4$'s, vol. percent _____ 13.3
- Dry gas, wt. percent _____ 6.0
- Coke, wt. percent _____ 2.5
- $H_2$, wt. percent _____ 0.02

Δ advantage:
- 10 R.V.P., vol. percent _____ +4.8
- Excess $C_4$'s, vol. percent _____ −1.7
- $C_5+$ gasoline, vol. percent _____ +4.8
- Total $C_4$'s, vol. percent _____ −1.8
- Dry gas, wt. percent _____ −1.3
- Coke, wt. percent _____ −1.6

*Example 28*

10 parts by weight of a crystalline synthetic aluminosilicate identified as Zeolite 13X was dispersed into 90 parts of a silica alumina matrix and the composition was treated with an aqueous solution consisting of 1% by weight of didymium chloride and 1% by weight of ammonium chloride for 24 continuous hours. The aluminosilicate was then washed with water until there were no chloride ions in the effluent, dried and then treated for 24 hours at 1200° F. with steam at a pressure of 15 p.s.i.g. to yield a catalyst having 8.77% by weight of rare earths, determined as rare earth oxides.

The following table shows the cracking data of the catalyst when evaluated for cracking gas oil at 900° F.:

TABLE

Cracking data:
- Conversion, vol. percent _____ 63.1
- LHSV _____ 4
- 10 R.V.P. gaso., vol. percent _____ 52.7
- Excess $C_4$'s, vol. percent _____ 11.8
- $C_5+$ gasoline, vol. percent _____ 50.1
- Total $C_4$'s, vol. percent _____ 14.4
- Dry gas, wt. percent _____ 7.1
- Coke, wt. percent _____ 3.3
- $H_2$, wt. percent _____ 0.18

Δ advantage:
- 10 R.V.P., vol. percent _____ +6.2
- Excess $C_4$'s, vol. percent _____ −3.2
- $C_5+$ gasoline, vol. percent _____ +5.9
- Total $C_4$'s, vol. percent _____ −2.6
- Dry gas, wt. percent _____ −1.1
- Coke, wt. percent _____ −1.8

*Example 29*

The procedure of Example 28 was repeated with the exception that a 2% by weight solution of didymium chloride was employed for 16 continuous hours and then a 1% by weight solution of ammonium chloride was employed for 24 continuous hours. The cracking data of the resulting catalyst is shown in the following table:

TABLE

Cracking data:
- Conversion, vol. percent _____ 58.6
- LHSV _____ 4
- 10 R.V.P. gaso., vol. percent _____ 50.8
- Excess $C_4$'s, vol. percent _____ 11.1
- $C_5+$ gasoline, vol. percent _____ 48.6
- Total $C_4$'s, vol. percent _____ 13.3
- Dry gas, wt. percent _____ 5.6
- Coke, wt. percent _____ 2.1
- $H_2$, wt. percent _____ 0.04

Δ advantage:
- 10 R.V.P., vol. percent _____ +6.7
- Excess $C_4$'s, vol. percent _____ −2.1
- $C_5+$ gasoline, vol. percent _____ +6.7
- Total $C_4$'s, vol. percent _____ −2.2
- Dry gas, wt. percent _____ −1.8
- Coke, wt. percent _____ −2.1

*Example 30*

25 parts by weight of a synthetic crystalline aluminosilicate identified as Zeolite 13X was dispersed in 75 parts of a silica alumina matrix and the resulting composition treated with a 2% by weight solution of calcium chloride for 8 continuous hours, followed by treatment with an aqueous solution consisting of 2% by weight of calcium chloride and 0.5% by weight of ammonium chloride for 16 continuous hours and then treated with a 2% by weight aqueous solution of rare earth chlorides for 2 contacts, each of 2 hours. The aluminosilicate was then washed with water until there were no chloride ions in the effluent, dried and then treated for 20 hours at 1225° F. with 100% atmospheric steam to yield a catalyst having a calcium content of 2.15% by weight and a rare earths content, determined as rare earth oxides, of 7.2% by weight.

The following table shows the cracking data of the catalyst when evaluated for cracking gas oil at 900° F.:

TABLE

Cracking data:
- Conversion, vol. percent _____ 57.3
- LHSV _____ 4
- 10 R.V.P. gaso., vol. percent _____ 46.1
- Excess $C_4$'s, vol. percent _____ 11.3
- $C_5+$ gasoline, vol. percent _____ 43.3
- Total $C_4$'s vol. percent _____ 14.1
- Dry gas, wt. percent _____ 6.6
- Coke, wt. percent _____ 4.0
- $H_2$, wt. percent _____ 0.03

Δ advantage:
- 10 R.V.P. vol percent _____ +2.7
- Excess $C_4$'s, vol. percent _____ −1.6
- $C_5+$ gasoline, vol. percent _____ +2.0
- Total $C_4$'s, vol. percent _____ −1.0
- Dry gas, wt. percent _____ −0.6
- Coke, wt. percent _____ −0.1

*Example 31*

25 parts by weight of a synthetic crystalline aluminosilicate identified as Zeolite 13X was dispersed in 75 parts by weight of a silica alumina matrix and the resulting composition treated with an aqueous solution consisting of 2% by weight mixture of rare earth chlorides and 0.5% by weight of acetic acid for 12 contacts each being two hours in duration. The aluminosilicate was then washed with water until there were no chloride or acetate ions in the effluent, dried and then treated for 20 hours at 1225° F. with a 100% atmospheric steam to yield a catalyst having a rare earths content, determined as rare earth oxides, of 3.17%.

The following table shows the cracking data of the catalyst when evaluated for cracking gas oil at 900° F.:

TABLE

Cracking data:
- Conversion, vol. percent _____ 43.0
- LHSV _____ 4
- 10 R.V.P. gaso., vol. percent _____ 34.3
- Excess $C_4$'s, vol. percent _____ 9.6
- $C_5+$ gasoline, vol. percent _____ 32.6
- Total $C_4$'s, vol. percent _____ 11.1
- Dry gas, wt. percent _____ 5.1
- Coke, wt. percent _____ 2.4
- $H_2$, wt. percent _____ 0.02

Example 32

10 parts by weight of a synthetic crystalline aluminosilicate identified as Zeolite 13X was dispersed into 90 parts by weight of a silica alumina matrix and the resulting composition was water washed first for 48 hours and then treated with a 2% aqueous solution of lanthanum chloride for 1 continuous 16-hour contact and then treated with a 1% solution of ammonium chloride for 24 continuous hours. The aluminosilicate was then washed with water until there were no chloride ions in the effluent, dried and then treated for 24 hours at 1200° F. with steam at 15 p.s.i.g. to yield a catalyst having a lanthanum oxide content of 5.92.

The following table shows the cracking data of the catalyst when evaluated for cracking gas oil at 900° F.:

TABLE

Cracking data:
- Conversion, vol. percent _____ 59.9
- LHSV _____ 4
- 10 R.V.P. gasoline, vol. percent _____ 51.0
- Excess $C_4$'s, vol. percent _____ 7.9
- $C_5+$ gasoline, vol. percent _____ 47.8
- Total $C_4$'s, vol. percent _____ 11.1
- Dry gas, wt. percent _____ 7.3
- Coke, wt. percent _____ 3.4
- $H_2$, wt. percent _____ 0.03

Δ advantage:
- 10 R.V.P., vol. percent _____ +6.2
- Excess $C_4$'s, vol. percent _____ −5.9
- $C_5+$ gasoline, vol. percent _____ +5.2
- Total $C_4$'s, vol. percent _____ −4.8
- Dry gas, wt. percent _____ −0.3
- Coke, wt. percent _____ −1.1

Example 33

10 parts by weight of a rare earth synthetic aluminosilicate prepared by reacting Zeolite 13X with a rare earth chloride solution was dispersed in a silica alumina matrix and the resulting composition was treated with a solution consisting of 2% by weight of calcium chloride and 1% by weight of ammonium chloride for 24 continuous hours. The aluminosilicate was then washed with water until there were no chloride ions in the effluent, dried and then treated for 20 hours at 1225° F. with 100% atmospheric steam to yield a catalyst having a sodium content of 0.12 weight percent, calcium content of 2.5 weight percent, and a rare earths content, determined as rare earth oxides, of 2.4 weight percent.

The following table shows the cracking date of the catalyst when evaluated for cracking gas oil at 900° F.:

TABLE

Cracking data:
- Conversion, vol. percent _____ 46.2
- LHSV _____ 4
- 10 R.V.P. gaso., vol. percent _____ 37.1
- Excess $C_4$'s, vol. percent _____ 9.3
- $C_5+$ gasoline, vol. percent _____ 35.4
- Total $C_4$'s, vol. percent _____ 11.0
- Dry gas, wt. percent _____ 5.4
- Coke, wt. percent _____ 3.0
- $H_2$, wt. percent _____ 0.03

Example 34

The procedure of Example 33 was repeated with the exception that the treating solution was a 1% by weight solution of ammonium chloride instead of a solution of calcium and ammonium chlorides. The resulting catalyst contained 0.11% by weight sodium and 2.05% by weight rare earths and had the cracking data listed in the following table:

TABLE

Cracking data:
- Conversion, vol. percent _____ 59.9
- LHSV _____ 4
- 10 R.V.P. gaso., vol. percent _____ 49.2
- Excess $C_4$'s, vol. percent _____ 13.1
- $C_5+$ gasoline, vol. percent _____ 47.5
- Total $C_4$'s, vol. percent _____ 14.9
- Dry gas, wt. percent _____ 6.3
- Coke, wt. percent _____ 2.6
- $H_2$, wt. percent _____ 0.02

Δ advantage:
- 10 R.V.P., vol. percent _____ +4.4
- Excess $C_4$'s, vol. percent _____ −0.7
- $C_5+$ gasoline, vol. percent _____ +5.0
- Total $C_4$'s, vol. percent _____ −1.1
- Dry gas, wt. percent _____ −1.4
- Coke, wt. percent _____ −1.9

Example 35

10 parts by weight of a cerium aluminosilicate prepared by reacting an aluminosilicate identified as Zeolite 13X with a solution of cerium chloride was dispersed into a silica alumina matrix and the resulting composition was treated with a 1% by weight solution of ammonium chloride for 24 continuous hours. The aluminosilicate was then washed with water until there were no chloride ions in the effluent, dried and then treated for 24 hours at 1200° F. with steam at 15 p.s.i.g. to yield a catalyst having a cerium content of 2.2% by weight.

The following table shows the cracking data for the catalyst when evaluated for cracking gas oil at 900° F.:

TABLE

Cracking data:
- Conversion, vol. percent _____ 51.1
- LHSV _____ 4
- 10 R.V.P. gaso., vol. percent _____ 44.1
- Excess $C_4$'s, vol. percent _____ 9.1
- $C_5+$ gasoline, vol. percent _____ 42.0
- Total $C_4$'s, vol. percent _____ 11.2
- Dry gas, wt. percent _____ 4.9
- Coke, wt. percent _____ 2.4
- $H_2$, wt. percent _____ 0.02

Δ advantage:
- 10 R.V.P., vol. percent _____ +4.0
- Excess $C_4$'s, vol. percent _____ −1.8
- $C_5+$ gasoline, vol. percent _____ −4.0
- Total $C_4$'s, vol. percent _____ −1.9
- Dry gas, wt. percent _____ −1.3
- Coke, wt. percent _____ −0.6

Example 36

The procedure of Example 35 was repeated with the exception that the cerium aluminosilicate dispersed in the matrix was first treated with a 2% by weight solution of cerium chloride for 16 hours and then with a 1% by weight solution of ammonium chloride for 24 continuous hours. The resulting catalyst contained 6.6% by weight of cerium and its cracking data is shown in the following table when evaluated for cracking gas oil at 900° F.:

TABLE

Cracking data:
- Conversion, vol. percent _____ 54.3
- LHSV _____ 4
- 10 R.V.P. gasol, vol. percent _____ 45.4
- Excess $C_4$'s, vol. percent _____ 10.7
- $C_5+$ gasoline, vol. percent _____ 43.5
- Total $C_4$'s, vol. percent _____ 12.6
- Dry gas, wt. percent _____ 5.4
- Coke, wt. percent _____ 3.0
- $H_2$, wt. percent _____ 0.02

Δ advantage:
    10 R.V.P., vol. percent _____ +3.4
    Excess C₄'s, vol. percent _____ −1.2
    C₅+ gasoline, vol. percent _____ +3.7
    Total C₄'s, vol. percent _____ −1.6
    Dry gas, wt. percent _____ −1.3
    Coke, wt. percent _____ −0.6

*Example 37*

10 parts by weight of a lanthanum aluminosilicate prepared by reacting Zeolite 13X with a 5% by weight lanthanum chloride at 180° F. for one two-hour contact was dispersed in a silica alumina matrix and the resulting composition treated with a 1% by weight solution of ammonium chloride for 24 continuous hours. The aluminosilicate was then washed with water, dried and then treated for 24 hours at 1200° F. with steam at 15 p.s.i.g. to yield a catalyst having a rare earth content of 0.52% by weight, determined as rare earth oxides.

*Example 38*

The procedure of Example 37 was repeated with the exception that the aluminosilicate in the matrix was first treated with a 2% by weight solution of lanthanum chloride for 16 hours prior to the treatment with the 1% by weight solution of ammonium chloride for 24 hours. The resulting catalyst had a lanthanum content of 6.1% by weight and its cracking data is shown in the following table when evaluated for cracking gas oil at 900° F.:

TABLE

Cracking data:
    Conversion, vol. percent _____ 60.5
    LHSV _____ 4
    10 R.V.P. gaso., vol. percent _____ 51.5
    Excess C₄'s, vol. percent _____ 12.2
    C₅+ gasoline, vol. percent _____ 49.1
    Total C₄'s, vol. percent _____ 14.5
    Dry gas, wt. percent _____ 6.0
    Coke, wt. percent _____ 2.0
    H₂, wt. percent _____ 0.02

Δ advantage:
    10 R.V.P., vol. percent _____ +6.5
    Excess C₄'s, vol. percent _____ −1.8
    C₅+ gasoline, vol. percent _____ +6.1
    Total C₄'s, vol. percent _____ −1.5
    Dry gas, wt. percent _____ −1.7
    Coke, wt. percent _____ −2.6

*Example 39*

The procedure of Example 34 was repeated with the exception that the matrix was SiO₂ instead of a silica alumina matrix. The resulting catalyst had a rare earth content of 3.7% by weight.

*Example 40*

The procedure of Example 35 was repeated with the exception that the matrix was SiO₂ instead of silica alumina. The resulting catalyst had a rare earth content of 5.3% by weight.

*Example 41*

The procedure of Example 37 was repeated with the exception that the matrix was SiO₂ instead of silica alumina. The resulting aluminosilicate had a rare earth content of 3.7% by weight.

*Example 42*

The procedure of Example 38 was repeated with the exception that the matrix was SiO₂ instead of silica alumina. The resulting catalyst had a rare earth content of 9.1% by weight.

*Example 43*

25 parts by weight of a synthetic crystalline calcium aluminosilicate was dispersed into 75 parts by weight of a silica alumina matrix and the resulting composition treated with a 2% aqueous solution of rare earth chlorides for 16 continuous hours and then with a 1% by weight solution of ammonium chloride for 24 continuous hours. The aluminosilicate was washed with water until the effluent contained no chloride ions and then treated for 24 hours at 1200° F. with steam at 15 p.s.i.g. to yield a catalyst having a rare earth content, determined as rare earth oxides, of 4.97% by weight.

The following table shows the cracking data for the catalyst when evaluated for cracking gas oil at 900° F.:

TABLE

Cracking data:
    Conversion, vol. percent _____ 51.5
    LHSV _____ 4
    10 R.V.P. gaso., vol. percent _____ 49.3
    Excess C₄'s, vol. percent _____ 8.0
    C₅+ gasoline, vol. percent _____ 47.0
    Total C₄'s, vol. percent _____ 10.3
    Dry gas, wt. percent _____ 6.1
    Coke, wt. percent _____ 2.1
    H₂, wt. percent _____ 0.01

Δ advantage:
    10 R.V.P., vol. percent _____ +8.9
    Excess C₄'s, vol. percent _____ −3.0
    C₅+ gasoline, vol. percent _____ +9.0
    Total C₄'s, vol. percent _____ −3.0
    Dry gas, wt. percent _____ −0.2
    Coke, wt. percent _____ −1.0

*Example 44*

10 parts by weight of a crystalline aluminosilicate identified as Zeolite 13X was dispersed into 90 parts by weight of a silica lanthanum matrix containing 98.5% by weight of SiO₂ and 1.5% by weight of lanthanum oxides. The resulting composition was treated with a 2% aqueous solution of lanthanum chloride for 16 continuous hours and then with a 1% solution of ammonium chloride for 24 continuous hours. The aluminosilicate was then washed with water until there were no chloride ions in the effluent, dried and then treated for 24 hours at 1200° F. with steam at a pressure of 15 p.s.i.g. to yield a catalyst having a rare earth content of 9.32% by weight.

*Example 45*

10 parts by weight of a synthetic crystalline aluminosilicate identified as Zeolite 13X was dispersed into 90 parts by weight of a silica rare earth oxide matrix consisting of 97% by weight of SiO₂ and 3% by weight of rare earth oxides. The resulting composition was treated with an aqueous solution consisting of 2% by weight of a mixture of rare earth chlorides for 16 hours and then with a 1% by weight solution of ammonium chloride for 24 continuous hours. The resulting aluminosilicate was washed with water until the effluent contained no chloride ions, dried and then treated for 24 hours at 1200° F. at 15 p.s.i.g. with steam to yield a catalyst having a rare earth content of 7.8% by weight, determined as rare earth oxides.

*Example 46*

10 parts by weight of a synthetic crystalline aluminosilicate identified as Zeolite 13X was dispersed into 90 parts by weight of a silica didymium matrix consisting of 97% by weight SiO₂ and 3% by weight didymium oxides. The resulting composition was then treated for 16 continuous hours with an aqueous solution consisting of 2% by weight of lanthanum chloride and then for 24 continuous hours with 1% by weight aqueous solution of ammonium chloride. The aluminosilicate was then washed with water until the effluent contained no chloride ions, dried and then treated for 24 hours at 1200° F. with steam at 15 p.s.i.g. to yield a catalyst having a rare earth content of 7.78% by weight, determined as rare earth oxides.

The resulting catalyst had the cracking data shown in the following table when evaluated for cracking gas oil at 900° F.:

Cracking data: TABLE

| | |
|---|---|
| Conversion, vol. percent | 53.3 |
| LHSV | 4 |
| 10 R.V.P. gaso., vol. percent | 47.8 |
| Excess C$_4$'s, vol. percent | 7.8 |
| C$_5$+ gasoline, vol. percent | 45.3 |
| Total C$_4$'s, vol. percent | 10.3 |
| Dry gas, wt. percent | 5.1 |
| Coke, wt. percent | 2.0 |
| H$_2$, wt. percent | 0.05 |

Δ advantage:

| | |
|---|---|
| 10 R.V.P., vol. percent | +6.4 |
| Excess C$_4$'s, vol. percent | −5.4 |
| C$_5$+ gasoline, vol. percent | +6.2 |
| Total C$_4$'s, vol percent | −5.1 |
| Dry gas, wt. percent | −1.4 |
| Coke, wt. percent | −1.4 |

*Example 47*

The procedure of Example 46 was repeated with the exception that a 2% by weight aqueous solution of didymium chloride was employed instead of the lanthanum chloride. The resulting catalyst had a sodium content of 0.5% by weight and a rare earth content of 11.2% by weight and the cracking data shown in the following table:

Cracking data: TABLE

| | |
|---|---|
| Conversion, vol. percent | 48.1 |
| LHSV | 4 |
| 10 R.V.P. gaso., vol. percent | 43.4 |
| Excess C$_4$'s, vol. percent | 6.6 |
| C$_5$+ gasoline, vol. percent | 41.0 |
| Total C$_4$'s, vol. percent | 9.1 |
| Dry gas, wt. percent | 4.7 |
| Coke, wt. percent | 1.6 |
| H$_2$, wt. percent | 0.08 |

Δ advantage:

| | |
|---|---|
| 10 R.V.P., vol. percent | +4.9 |
| Excess C$_4$'s, vol. percent | −3.4 |
| C$_5$+ gasoline, vol. percent | +4.8 |
| Total C$_4$'s, vol. percent | −3.4 |
| Dry gas, wt. percent | −1.0 |
| Coke, wt. percent | −1.0 |

*Example 48*

10 parts by weight of a synthetic crystalline aluminosilicate identified as Zeolite 13X was dispersed in 90 parts by weight of a silica alumina lanthanum matrix consisting of 91% by weight SiO$_2$, 3% by weight Al$_2$O$_3$ and 6% by weight of lanthanum oxides. The resulting composition was treated with a combined 1% by weight aqueous solution of lanthanum chloride and a 1% by weight solution of ammonium chloride for 24 continuous hours. The aluminosilicate was then washed with water until the effluent contained no chloride ions, dried and then treated for 24 hours at 1200° F. with steam at 15 p.s.i.g. to yield a catalyst having a sodium content of 0.15% by weight and a rare earth content of 11.5% by weight, determined as rare earth oxides.

The cracking data of the resulting catalyst are shown in the following table, when the catalyst was evaluated for cracking gas oil at 900° F.:

TABLE

Cracking data:

| | |
|---|---|
| Conversion, vol. percent | 54.0 |
| LHSV | 4 |
| 10 R.V.P. gaso., vol. percent | 49.8 |
| Excess C$_4$'s vol. percent | 7.5 |
| C$_5$+ gasoline, vol. percent | 46.9 |
| Total C$_4$'s, vol. percent | 10.4 |
| Dry gas, wt. percent | 4.8 |
| coke, wt. percent | 1.8 |
| H$_2$, wt. percent | 0.01 |

Δ advantage:

| | |
|---|---|
| 10 R.V.P., vol. percent | +8.0 |
| Excess C$_4$'s, vol. percent | −5.9 |
| C$_5$+ gasoline, vol. percent | +7.4 |
| Total C$_4$'s, vol. percent | −5.2 |
| Dry gas, wt. percent | −2.7 |
| Coke, wt. percent | −2.6 |

*Example 49*

10 parts by weight of a crystalline aluminosilicate identified as Zeolite 13Y was dispersed into 90 parts by weight of a silica alumina matrix and the resulting composition was treated for 16 continuous hours with an aqueous solution comprising a 2% by weight mixture of rare earth chlorides and then for 24 continuous hours with a 1% by weight aqueous ammonium chloride solution. The aluminosilicate was then washed with water until the effluent contained no chloride ions, dried and then treated for 24 hours at 1200° F. with steam at 15 p.s.i.g. to yield a catalyst having a rare earth content of 3.35 weight percent.

The cracking data of the resulting catalyst is shown in the following table when evaluated for cracking gas oil at 900° F.:

TABLE

Cracking data:

| | |
|---|---|
| Conversion, vol. percent | 58.2 |
| LHSV | 4 |
| 10 R.V.P. gaso., vol. percent | 50.8 |
| Excess C$_4$'s, vol. percent | 10.6 |
| C$_5$+ gasoline, vol. percent | 48.3 |
| Total C$_4$'s, vol. percent | 13.1 |
| Dry gas, wt. percent | 5.4 |
| Coke, wt. percent | 2.0 |
| H$_2$, wt. percent | 0.01 |

Δ advantage:

| | |
|---|---|
| 10 R.V.P., vol. percent | +6.8 |
| Excess C$_4$'s, vol. percent | −2.5 |
| C$_5$+ gasoline, vol. percent | +6.5 |
| Total C$_4$'s, vol. percent | −2.3 |
| Dry gas, wt. percent | −1.9 |
| Coke, wt. percent | −2.2 |

*Example 50*

The procedure of Example 49 was repeated with the exception that a 2% by weight aqueous solution of lanthanum chloride was employed instead of the rare earth chloride solution. The resulting catalyst had a lanthanum content of 3.29 weight percent determined as lanthanum oxide.

The cracking data of the resulting catalyst is shown in the following table:

TABLE

Cracking data:

| | |
|---|---|
| Conversion, vol. percent | 61.8 |
| LHSV | 4 |
| 10 R.V.P., gaso., vol. percent | 54.0 |
| Excess C$_4$'s, vol. percent | 11.1 |
| C$_5$+ gasoline, vol. percent | 51.5 |
| Total C$_4$'s, vol. percent | 13.7 |
| Dry gas, wt. percent | 5.8 |
| Coke, wt. percent | 2.0 |
| H$_2$, wt. percent | 0.02 |

Δ advantage:

| | |
|---|---|
| 10 R.V.P., vol. percent | +8.2 |
| Excess C$_4$'s, vol. percent | −3.3 |
| C$_5$+ gasoline, vol. percent | +8.0 |
| Total C$_4$'s, vol. percent | −2.8 |
| Dry gas, wt. percent | −2.2 |
| Coke, wt. percent | −2.8 |

Examples 51–59 illustrate the use of clays which have been treated with caustic admixture with a source of silica, such as sand, silica gel or sodium silicate, calcined at temperatures ranging from 230° F. to 1600° F., crushed, dispersed in water and digested.

*Example 51*

10% by weight of a McNamee clay which had been caustic treated was dispersed in 90 parts by weight of a silica alumina matrix. The resulting composition was treated with a 2% aqueous solution of lanthanum chloride for 16 continuous hours and then with a 1% by weight solution of ammonium chloride for 24 continuous hours. The resulting aluminosilicate was washed with water until the effluent contained no chloride ions, dried and then treated for 24 hours at 1200° F. with steam at 15 p.s.i.g. to yield a catalyst having a lanthanum content of 5.15%, determined as lanthanum oxide.

The following table shows the cracking data of the catalyst when evaluated for cracking gas oil at 900° F.:

TABLE

Cracking data:

| | |
|---|---|
| Conversion, vol percent | 54.2 |
| LHSV | 4 |
| 10 R.V.P. gaso., vol. percent | 48.8 |
| Excess $C_4$'s, vol. percent | 9.8 |
| $C_5+$ gasoline, vol. percent | 46.6 |
| Total $C_4$'s, vol. percent | 11.9 |
| Dry gas, wt. percent | 4.8 |
| Coke, wt. percent | 1.4 |
| $H_2$, wt. percent | 0.04 |

Δ advantage:

| | |
|---|---|
| 10 R.V.P., vol. percent | +6.9 |
| Excess $C_4$'s, vol. percent | −2.0 |
| $C_5+$ gasoline, vol. percent | +7.0 |
| Total $C_4$'s, vol. percent | −2.1 |
| Dry gas, wt. percent | −1.9 |
| Coke, wt. percent | −2.1 |

*Example 52*

The process of Example 51 was repeated with the exception that the matrix was a silica gel instead of the silica alumina employed. The resulting aluminosilicate catalyst had a lanthanum oxide content of 6.06% by weight.

*Example 53*

10 parts by weight of a caustic treated McNamee clay was dispersed into a silica lanthanum matrix consisting of 97 parts by weight of $SiO_2$ and 3 parts by weight of lanthanum oxide. The resulting composition was subjected to a 24 hour continuous treatment with an aqueous solution consisting of 1% by weight lanthanum chloride and 1% by weight ammonium chloride. The aluminosilicate was then washed with water until the effluent contained no chloride ions, dried and then treated for 24 hours at 1200° F. with steam at 15 p.s.i.g. to yield a catalyst having a lanthanum content of 10.2% by weight, determined as lanthanum oxide.

*Example 54*

25 parts by weight of caustic treated McNamee clay was dispersed in 75 parts by weight of a silica lanthanum matrix consisting of 97% by weight of silica and 3% by weight of lanthanum oxide. The resulting composition was then treated with a 2% solution of didymium chloride for three 16-hour contacts and then with a 1% solution of ammonium chloride for 24 hours. The resulting aluminosilicate was then washed with water until the effluent contained no chloride ions, dried and then treated for 24 hours at 1200° F. with steam at 15 p.s.i.g. to yield a catalyst having a rare earth content of 9.45% by weight, determined as rare earth oxides.

The following table shows the cracking data of the catalyst when evaluated for cracking gas oil at 900° F.:

TABLE

Cracking data:

| | |
|---|---|
| Conversion, vol. percent | 61.6 |
| LHSV | 4 |
| 10 R.V.P. gaso., vol. percent | 53.3 |
| Excess $C_4$'s, vol. percent | 10.8 |
| $C_5+$ gasoline, vol. percent | 50.7 |
| Total $C_4$'s, vol. percent | 13.4 |
| Dry gas, wt. percent | 5.9 |
| Coke, wt. percent | 2.5 |
| $H_2$, wt. percent | 0.11 |

Δ advantage:

| | |
|---|---|
| 10 R.V.P., vol. percent | +7.6 |
| Excess C's, vol. percent | −3.6 |
| $C_5+$ gasoline, vol. percent | +7.2 |
| Total C's, vol. percent | −3.1 |
| Dry gas, wt. percent | −2.0 |
| Coke, wt. percent | −2.3 |

*Example 55*

10 parts by weight of a caustic treated bentonite clay was dispersed in 90 parts of a silica alumina matrix and the resulting composition was subjected to a 16-hour continuous treatment with an aqueous solution consisting of 2% by weight of lanthanum chloride and then with a 1% aqueous solution of ammonium chloride for 24 continuous hours. The resulting aluminosilicate was then washed with water until the effluent contained no chloride ions, dried and then treated for 24 hours at 1200° F. to obtain a catalyst having a lanthanum content of 5.66% by weight.

The following table shows the cracking data of the catalyst when evaluated for cracking gas oil at 900° F.:

TABLE

Cracking data:

| | |
|---|---|
| Conversion, percent | 51.1 |
| LHSV | 4 |
| 10 R.V.P. gaso., vol. percent | 44.6 |
| Excess $C_4$'s, vol. percent | 8.7 |
| $C_5+$ gasoline, vol. percent | 42.3 |
| Total $C_4$'s, vol. percent | 10.9 |
| Dry gas, wt. percent | 5.4 |
| Coke, wt. percent | 1.5 |
| $H_2$, wt. percent | 0.11 |

Δ advantage:

| | |
|---|---|
| 10 R.V.P., vol. percent | +4.5 |
| Excess $C_4$'s, vol. percent | −2.3 |
| $C_5+$ gasoline, vol. percent | +4.3 |
| Total $C_4$'s, vol. percent | −2.3 |
| Dry gas, wt. percent | −0.8 |
| Coke, wt. percent | −1.6 |

*Example 56*

10 parts by weight of halloysite clay which has been caustic treated was dispersed in 90 parts by weight of a silica alumina matrix and the resulting composition treated with a 2% by weight aqueous solution of a mixture of rare earth chlorides for 16 hours and then with a 1% by weight aqueous solution of ammonium chloride for 24 continuous hours. The aluminosilicate was then washed with water until the effluent contained no chloride ions, dried and then treated for 24 hours at 1200° F. with steam at a pressure of 15 p.s.i.g. to yield a catalyst having a rare earth content of 6.08.

The following table shows the cracking data of the catalyst when evaluated for cracking gas oil at 900° F.:

TABLE

Cracking data:
| | |
|---|---|
| Conversion, vol. percent | 57.6 |
| LHSV | 4 |
| 10 R.V.P. gaso., vol. percent | 50.6 |
| Excess $C_4$'s, vol. percent | 10.9 |
| $C_5+$ gasoline, vol. percent | 48.3 |
| Total $C_4$'s, vol. percent | 13.4 |
| Dry gas, wt. percent | 5.3 |
| Coke, wt. percent | 1.7 |
| $H_2$, wt. percent | 0.03 |

Δ advantage:
| | |
|---|---|
| 10 R.V.P., vol. percent | +7.0 |
| Excess $C_4$'s, vol. percent | −2.1 |
| $C_5+$ gasoline, vol. percent | +6.8 |
| Total $C_4$'s, vol. percent | −1.7 |
| Dry gas, wt. percent | −2.0 |
| Coke, wt. percent | −2.5 |

*Example 57*

The procedure of Example 56 was repeated with the exception that a 2% by weight aqueous solution of lanthanum chloride was employed instead of the rare earth chloride solution. The resulting catalyst had a lanthanum content of 6.82% by weight and the cracking data shown in the following table:

TABLE

Cracking data:
| | |
|---|---|
| Conversion, vol. percent | 58.4 |
| LHSV | 4 |
| 10 R.V.P. gaso., vol. percent | 49.3 |
| Excess $C_4$'s, vol. percent | 11.3 |
| $C_5+$ gasoline, vol. percent | 47.0 |
| Total $C_4$'s, vol. percent | 13.6 |
| Dry gas, wt. percent | 6.3 |
| Coke, wt. percent | 2.0 |
| $H_2$, wt. percent | 0.03 |

Δ advantage:
| | |
|---|---|
| 10 R.V.P., vol. percent | +5.3 |
| Excess C's, vol. percent | −1.9 |
| $C_5+$ gasoline, vol. percent | +5.2 |
| Total C's, vol. percent | −1.8 |
| Dry gas, wt. percent | −1.1 |
| Coke, wt. percent | −2.3 |

*Example 58*

25 parts by weight of a caustic treated Dixie clay was dispersed into a silica alumina matrix and the composition was treated with an aqueous solution consisting of 1% by weight of a mixture of rare earth chlorides and 1% by weight ammonium chloride for 24 continuous hours. The aluminosilicate was then washed with water until the effluent contained no chloride ions, dried and then treated for 20 hours at 1225° F. with 100% atmospheric steam to yield a catalyst having a dosium content of 0.56% by weight and a rare earth content of 8.2% by weight, determined as rare earth oxides.

The following table shows the cracking data of the catalyst when evaluated for cracking gas oil at 900° F.:

TABLE

Cracking data:
| | |
|---|---|
| Conversion, vol. percent | 46.2 |
| LHSV | 2 |
| 10 R.V.P. gaso., vol. percent | 40.0 |
| Excess $C_4$'s, vol. percent | 7.3 |
| $C_5+$ gasoline, vol. percent | 37.7 |
| Total $C_4$'s, vol. percent | 9.6 |
| Dry gas, wt. percent | 4.7 |
| Coke, wt. percent | 2.6 |
| $H_2$, wt. percent | 0.22 |

Δ advantage:
| | |
|---|---|
| 10 R.V.P., vol. percent | +2.5 |
| Excess $C_4$'s, vol. percent | −2.2 |
| $C_5+$ gasoline, vol. percent | +2.6 |
| Total $C_4$'s, vol. percent | −2.2 |
| Dry gas, wt. percent | −0.7 |
| Coke, wt. percent | +0.2 |

*Example 59*

McNamee clay,[3] which has been caustic treated, was subjected to treatment with an aqueous solution consisting of 5% by weight of a mixture of rare earth chlorides and 2% by weight ammonium chloride. The aluminosilicate was then washed with water until the effluent contained no chloride ions and treated for 20 hours at 1225° F. with steam at atmospheric pressure. The resulting aluminosilicate was evaluated for cracking gas oil at 900° F. and gave the following results:

TABLE

Cracking data:
| | |
|---|---|
| Conversion, vol. percent | 57.2 |
| LHSV | 16 |
| 10 R.V.P. gaso., vol. percent | 49.9 |
| Excess $C_4$'s, vol. percent | 9.5 |
| $C_5+$ gasoline, vol. percent | 47.4 |
| Total $C_4$'s, vol. percent | 12.0 |
| Dry gas, wt. percent | 5.6 |
| Coke, wt. percent | 2.8 |
| $H_2$, wt. percent | 0.05 |

Δ advantage:
| | |
|---|---|
| 10 R.V.P., vol. percent | +6.5 |
| Excess $C_4$'s, vol. percent | −3.2 |
| $C_5+$ gasoline, vol. percent | +6.2 |
| Total $C_4$'s, vol. percent | −3.0 |
| Dry gas, wt. percent | −1.6 |
| Coke, wt. percent | −1.2 |

*Example 60*

2% by weight of a synthetic crystalline aluminosilicate identified as Zeolite 13Y which has been treated with rare earth ions and ammonium ions was dispersed into a silica-alumina matrix (94% $SiO_2$, 6% $Al_2O_3$) and sufficient raw McNamee clay added for controlled porosity to constitute 23 weight percent of the final catalyst. The resulting bead hydrogel was then treated with a 1.4% by weight aqueous solution of ammonium sulfate continuously for 24 hours, washed, dried and calcined. The final catalyst analyzed 0.08 weight percent sodium and 0.74 weight percent rare earth oxides. After steam treating for 24 hours at 1200° F. with 15 p.s.i.g. steam, the surface area was 96 m.²/gram.

The following table shows the cracking data obtained when the catalyst was evaluated for cracking gas oil at 900° F. and at a catalyst to oil ratio of 1.5:

TABLE

Cracking data:
| | |
|---|---|
| Conversion, vol. percent | 38.5 |
| LHSV | 4 |
| 10 R.V.P. gaso., vol. percent | 35.1 |
| Excess $C_4$'s, vol. percent | 6.3 |
| $C_5+$ gasoline, vol. percent | 33.2 |
| Total $C_4$'s, vol. percent | 8.2 |
| Dry gas, wt. percent | 3.6 |
| Coke, wt. percent | 0.99 |
| $H_2$, wt. percent | |

[3] $Al_2O_3$—39.85 wt. percent, $SiO_2$—44.9 wt. percent, $F_2O_3$—0.35 wt. percent, $TiO_2$—0.75 wt. percent, CaO—trace, MgO—trace, $Na_2O$—0.12 wt. percent, $K_2O$—0.10 wt. percent.

TABLE—Continued

Δ advantage:

| | |
|---|---|
| 10 R.V.P., vol. percent | +2.5 |
| Excess C$_4$'s, vol. percent | −0.9 |
| C$_5$+ gasoline, vol. percent | +2.7 |
| Total C$_4$'s, vol. percent | −1.2 |
| Dry gas, wt. percent | −0.6 |
| Coke, wt. percent | −0.6 |

Example 61

50 grams of a rare earth-hydrogen aluminosilicate, prepared by reacting Zeolite 13Y with rare earth ions and a source of hydrogen ions, and 150 grams of aluminum metal powder were mixed in a ball mill for 4 hours. The mixture was then pelleted and sized to 4 x 10 mesh, calcined in air for 10 hours at 1000° F. and then treated for 24 hours at a 1200° F. temperature with steam at 15 p.s.i.g. to yield a catalyst composition having a sodium content of 0.09 weight percent, a rare earth oxides content of 2.76 percent by weight and a surface area of 76 sq. meters per gram.

The following table shows the cracking data obtained when the catalyst was evaluated for cracking gas oil at 900° F. and at a catalyst to oil ratio of 1.5:

TABLE

Cracking data:

| | |
|---|---|
| Conversion, vol. percent | 71.9 |
| LHSV | 4 |
| 10 R.V.P. gaso., vol. percent | 64.3 |
| Excess C$_4$'s, vol. percent | 12.0 |
| C$_5$+ gasoline, vol. percent | 61.1 |
| Total C$_4$'s, vol. percent | 15.3 |
| Dry gas, wt. percent | 5.9 |
| Coke, wt. percent | 2.6 |
| H$_2$, wt. percent | 0.02 |

Δ advantage:

| | |
|---|---|
| 10 R.V.P., vol. percent | +14.2 |
| Excess C$_4$'s, vol. percent | −6.9 |
| C$_5$+ gasoline, vol. percent | +12.8 |
| Total C$_4$'s, vol. percent | −5.5 |
| Dry gas, wt. percent | −3.9 |
| Coke, wt. percent | −4.2 |

Examples 62–77 illustrate the use of individual rare earth metals instead of mixtures of rare earths. The salts employed were individual chlorides and all had a minimum purity of 99.9% except scandium chloride (99.5%) and europium chloride (99.8%).

In each of Examples 52–77, portions of the same batch of hydrogel beads containing 10 weight percent Zeolite X were treated with the individual rare earth chloride solutions. The hydrogel beads were prepared by admixture of the following solutions:

A. Sodium silicate solution:

| | Lbs. |
|---|---|
| Water | 143 |
| Sodium hydroxide (77.5% Na$_2$O) | 11 |
| Sodium silicate (28.8% SiO$_2$) | 77.5 |
| | 231.5 |

B. Sodium aluminate solution:

| | |
|---|---|
| Water | 195 |
| Sodium hydroxide (77.5% Na$_2$O) | 11 |
| Sodium aluminate (43.5% Al$_2$O$_3$) and (30.2% Na$_2$O) | 25.6 |
| | 231.6 |

Solution B having a specific gravity at 111° F. of 1.128 was added to Solution A, having a specific gravity of 1.172 at 68° F. with vigorous agitation to form a creamy slurry. The resulting slurry was heated for 12 hours at 205° F. and was thereafter filtered. The filter cake was washed with water until the water in equilibrium with the washed solid had a pH of 11. The washed filter cake was then dried in air at a temperature of 280° F.

10 parts of the finely divided sodium aluminosilicate was incorporated into a silica-alumina gel resulting from admixture of the following materials.

A. Sodium silicate solution:
   49.1 wt. percent sodium silicate (Na$_2$O/SiO$_2$=0.3/1)
   48.0 wt. percent water
   2.9 wt. percent sodium aluminosilicate powder containing 55% solids at 230° F.

B. Acid solution:
   93.43 wt. percent water
   3.44 wt. percent aluminum sulfate
   3.13 wt. percent sulfuric acid Solution A having a specific gravity of 1.182 at 52° F. and Solution B having a specific gravity of 1.057 at 80° F. were continuously mixed together through a mixing nozzle using 454 cc. per minute of the silicate solution at 40° F. and 420 cc. per minute of the acid solution at 45° F. The resulting hydrosol, containing 10 percent by weight dispersed crystalline sodium aluminosilicate powder, on a finished catalyst basis, was formed into hydrogel beads at 49° F. with a gelation time of 2.2 seconds at a pH of 8.5 by introducing globules of the sol into an oil medium.

The resulting hydrogel beads were then soaked in a 2% by weight solution of the individual rare earth chloride for eighteen hours at room temperature. Each sample was then treated with a 1% by weight solution of ammonium chloride for 15 contacts, each contact being for 2 hours in duration. Each sample was then washed with water for 72 hours at room temperature, dried at 230° F., calcined ten hours at 1000° F. and treated for 24 hours at 1200° F. with steam at 15 p.s.i.g.

The following table shows the cracking data obtained when the catalyst were evaluated for cracking gas oil at 900° F. and an LHSV of 4.

TABLE

| Examples | 62 Sc | 63 Y | 64 La | 65 Ce | 66 Pr | 67 Nd | 68 Sm | 69 Eu |
|---|---|---|---|---|---|---|---|---|
| Na, Wt. percent | 0.17 | 0.41 | 0.22 | 0.26 | 0.24 | 0.25 | 0.29 | 0.33 |
| Re. Oxide, Wt. percent | 3.09 | 4.23 | 5.11 | 5.24 | 5.88 | 5.36 | 6.20 | 6.43 |
| Conversion, Vol. percent | 34.9 | 41.4 | 58.1 | 40.0 | 54.2 | 54.0 | 50.9 | 37.5 |
| C$_5$+ gasoline, Vol. percent | 29.5 | 36.0 | 47.2 | 33.6 | 45.2 | 44.4 | 43.1 | 28.9 |
| 10 R.V.P. Gaso. Vol. percent | 31.1 | 38.1 | 49.4 | 35.6 | 47.5 | 46.8 | 45.5 | 30.2 |
| Total C$_4$'s, Vol. percent | 7.4 | 8.7 | 13.6 | 8.4 | 12.1 | 11.9 | 10.7 | 9.5 |
| Excess C$_4$'s, Vol. percent | 5.8 | 6.6 | 11.4 | 6.3 | 9.8 | 9.5 | 8.3 | 8.2 |
| Dry Gas, Wt. percent | 3.6 | 3.7 | 6.1 | 4.2 | 5.0 | 5.6 | 4.7 | 4.8 |
| Coke, Wt. percent | 1.1 | 1.1 | 1.9 | 1.2 | 2.1 | 1.9 | 2.0 | 1.7 |
| H$_2$, Wt. percent | 0.01 | 0.01 | 0.02 | 0.02 | 0.01 | 0.02 | 0.01 | 0.02 |
| Advantage: | | | | | | | | |
| C$_5$+ gasoline, Vol. percent | +1.0 | +3.6 | +5.5 | +2.1 | +3.0 | +4.9 | +5.3 | −1.1 |
| Total C$_4$'s, Vol. percent | −1.4 | −1.7 | −1.7 | −1.6 | −1.9 | −2.1 | −2.3 | 0.0 |
| 10 R.V.P. Gaso., Vol. percent | +0.6 | +3.3 | +5.4 | +1.8 | +3.0 | +5.0 | +5.5 | −2.2 |
| Excess C$_4$'s, Vol. percent | −0.7 | −1.4 | −1.8 | −1.5 | −2.0 | −2.3 | −2.5 | +1.2 |
| Dry Gas, Wt. percent | −0.1 | −1.0 | −1.2 | −0.2 | −2.5 | −1.0 | −1.4 | +0.8 |

TABLE—Continued

| Examples | 70 Gd | 71 Tb | 72 Dy | 73 Ho | 74 Er | 75 Tm | 76 Yb | 77 Lu |
|---|---|---|---|---|---|---|---|---|
| Na, Wt. percent | 0.34 | 0.34 | 0.36 | 0.34 | 0.39 | 0.32 | 0.39 | 0.36 |
| Re. Oxide, Wt. percent | 5.70 | 6.24 | 5.63 | 5.48 | 5.85 | 5.99 | 6.22 | 6.84 |
| Conversion, Vol. percent | 46.6 | 42.9 | 42.8 | 43.0 | 34.8 | 36.0 | 39.1 | 34.2 |
| $C_5+$ gasoline, Vol. percent | 39.9 | 37.1 | 36.8 | 36.2 | 29.8 | 30.9 | 32.6 | 29.2 |
| 10 R.V.P. Gaso., Vol. percent | 42.1 | 39.2 | 38.9 | 38.3 | 31.6 | 32.7 | 34.6 | 30.8 |
| Total $C_4$'s, Vol. percent | 10.1 | 8.9 | 9.0 | 9.2 | 7.0 | 7.6 | 8.4 | 7.4 |
| Excess $C_4$'s, Vol. percent | 7.9 | 6.8 | 6.9 | 7.1 | 5.2 | 5.8 | 6.4 | 5.8 |
| Dry Gas, Wt. percent | 4.3 | 3.9 | 4.0 | 4.5 | 6.0 | 3.5 | 4.3 | 3.3 |
| Coke, Wt. percent | 1.1 | 1.0 | 1.1 | 1.1 | 1.1 | 1.1 | 1.0 | 1.1 |
| $H_2$, Wt. percent | 0.01 | 0.01 | 0.02 | 0.02 | 0.02 | 0.02 | 0.02 | 0.02 |
| Advantage: | | | | | | | | |
| $C_5+$ gasoline, Vol. percent | +4.5 | +3.9 | +3.7 | +2.9 | +1.5 | +1.9 | +1.6 | +1.2 |
| Total $C_4$'s, Vol. percent | −1.8 | −1.9 | −1.8 | −1.7 | −1.8 | −1.4 | −1.5 | −1.1 |
| 10 R.V.P. Gaso., Vol. percent | +4.4 | +3.7 | +3.4 | +2.7 | +1.1 | +1.2 | +1.2 | +0.8 |
| Excess $C_4$'s, Vol. percent | −1.7 | −1.7 | −1.6 | −1.4 | −1.3 | −1.0 | −1.1 | −0.5 |
| Dry Gas, Wt. percent | −1.7 | −0.9 | −0.8 | −0.3 | +2.4 | −0.2 | 0.0 | −0.3 |

*Example 78*

10 parts by weight of a synthetic crystalline aluminosilicate identified as Zeolite 13X was dispersed into 75 parts by weight of a silica-alumina matrix and 15 parts by weight of silica-alumina fines. The resulting composition was first treated with an aqueous solution containing 2% by weight rare earth chlorides for 16 continuous hours and then with an aqueous solution containing 1% by weight ammonium chloride for 24 continuous hours. The aluminosilicate composition was then washed with water until there were no chloride ions in the effluent, dried and then treated for 24 hours at 1200° F. with steam at a pressure of 15 p.s.i.g. to yield a catalyst having a rare earth content determined as rare earth oxides of 5.21 weight percent.

The following table shows the cracking data of the catalyst when evaluated for cracking gas oil at 900° F.:

TABLE

Cracking data:
Conversion, vol. percent _____ 58.0
LHSV _____ 4
10 R.V.P. gaso., vol. percent _____ 49.7
Excess $C_4$'s, vol. percent _____ 9.3
$C_5+$ gasoline, vol. percent _____ 46.6
Total $C_4$'s, vol. percent _____ 12.4
Dry gas, wt. percent _____ 6.7
Coke, wt. percent _____ 0.03

Δ advantage:
10 R.V.P., vol. percent _____ +5.9
Excess $C_4$'s, vol. percent _____ −3.7
$C_5+$ gasoline, vol. percent _____ +5.0
Total $C_4$'s, vol. percent _____ −2.8
Dry gas, wt. percent _____ −0.6
Coke, wt. percent _____ −2.0

*Example 79*

The procedure of Example 78 was repeated with the exception that a 2% by weight aqueous solution of lanthanum chloride was employed in place of the rare earth chloride solution. The resulting catalyst had the cracking data shown in the following table when evaluated for cracking gas oil at 900° F.:

TABLE

Cracking data:
Conversion, vol. percent _____ 58.6
LHSV _____ 4
10 R.V.P. gaso., vol. percent _____ 48.8
Excess $C_4$'s, vol. percent _____ 11.9
$C_5+$ gasoline, vol. percent _____ 46.6
Total $C_4$'s, vol. percent _____ 14.1
Dry gas, wt. percent _____ 6.6
Coke, wt. percent _____ 2.1
$H_2$, wt. percent _____ 0.03

Δ advantage:
10 R.V.P., vol. percent _____ +4.8
Excess $C_4$'s, vol. percent _____ −1.4
$C_5+$ gasoline, vol. percent _____ +4.6
Total $C_4$'s, vol. percent _____ −1.4
Dry gas, wt. percent _____ −0.8
Coke, wt. percent _____ −2.2

*Example 80*

50 grams of a rare earth-hydrogen aluminosilicate, prepared by reacting Zeolite 13Y with rare earth ions and a source of hydrogen ions, and 150 grams of alpha alumina were mixed in a ball mill for 4 hours. The resulting mixture was then pelleted and sized to 4 x 10 mesh, calcined in air for 10 hours at 1000° F. and then treated for 24 hours at 1200° F. with steam at 15 p.s.i.g. to yield a catalyst having a surface area of 76 sq. meters per gram.

The following table shows the cracking data obtained when the catalyst was evaluted for cracking gas oil at 900 °F. and at a catalyst to oil ratio of 1.5:

TABLE

Cracking data:
Conversion, vol. percent _____ 76.1
LHSV _____ 4
10 R.V.P. gaso., vol. percent _____ 63.9
Excess $C_4$'s, vol. percent _____ 14.2
$C_5+$ gasoline, vol. percent _____ 61.0
Total $C_4$'s, vol. percent _____ 17.2
Dry gas, wt. percent _____ 7.2
Coke, wt. percent _____ 3.5
$H_2$, wt. percent _____ 0.03

Δ advantage:
10 R.V.P., vol. percent _____ +12.8
Excess $C_4$'s, vol. percent _____ −5.9
$C_5+$ gasoline, vol. percent _____ +11.4
Total $C_4$'s, vol. percent _____ −4.7
Dry gas, wt. percent _____ −2.6
Coke, wt. percent _____ −4.2

*Example 81*

2,500 grams of a silica zirconia hydrogel (10% $ZrO_2$), 45 grams of McNamee clay (for controlled diffusivity), and 300 grams of a rare earth-hydrogen aluminosilicate, prepared by reacting Zeolite 13Y with rare earth ions and a source of hydrogen ions, and 1,000 milliliters of water were mixed vigorously in a Waring Blendor for 5 minutes. The resulting slurry was then dried at 230° F. for 48 hours, sized to 4 x 10 mesh and calcined in air for 10 hours at 1000° F. to yield a catalyst having a sodium content of 0.22 weight percent.

The following table shows the cracking data obtained when the catalyst was evaluated for cracking gas oil at 900° F. and at a catalyst to oil ratio of 1.5:

TABLE

Cracking data:
Conversion, vol. percent _____ 57.7
LHSV _____ 4
10 R.V.P. gaso., vol. percent _____ 47.5
Excess C₄'s, vol. percent _____ 10.7
C₅+ gasoline, vol. percent _____ 45.0
Total C₄'s, vol. percent _____ 13.1
Dry gas, wt. percent _____ 6.4
Coke, wt. percent _____ 3.5
H₂, wt. percent _____ 0.10

Δ advantage:
10 R.V.P., vol. percent _____ +4.2
Excess C₄'s, vol. percent _____ −2.1
C₅+ gasoline, vol. percent _____ +3.8
Total C₄'s, vol. percent _____ −1.8
Dry gas, wt. percent _____ −0.6
H₂, wt. percent _____ −0.7

The following examples further illustrate the use of the catalyst compositions in such reactions as isomerization, hydroisomerization and disproportionation.

*Example 82*

An equal volume mixture of 5% LaCl₃ hexahydrate and 2% NH₄Cl was passed through a bed of a synthetic crystalline aluminosilicate identified as Zeolite 13X (0.9Na₂O:Al₂O₃:2.5SiO₂:6.1H₂O)

at a temperature of 180° F. The rate was adjusted to consume 60 pounds of the solution over a 40 hour period. The treated product was washed with water until chloride free, dried at 230° F. for 20 hours and then calcined for 10 hours at 1000° F. The product analyzed 0.35 weight percent sodium and 26.2 weight percent lanthanum.

The catalyst prepared above was evaluated in the isomerization of normal hexane. The reaction was carried out at atmospheric pressure by passing the feed material in admixture with helium over the catalyst using a space velocity of 0.2. The results obtained are set forth in the Table below wherein pertinent data is set forth in terms of weight percent of isomers producted at a given conversion level.

TABLE

| Temp., °F. | Conversion | Isomers, Wt. Percent |
|---|---|---|
| 700 | 76.1 | 11.7 |
| 600 | 85.1 | 12.4 |
| 600 | 53.9 | 23.5 |
| 600 | 25.8 | 17.0 |
| 500 | 24.1 | 16.1 |

*Example 83*

A synthetic crystalline aluminosilicate identified as Zeolite 13X (0.9Na₂O:Al₂O₃:2.5SiO₂:6.1H₂O) was treated at 180° F. with an aqueous solution containing 5% by weight rare earth chloride hexahydrate and 2% by weight ammonium chloride. The rare earth chloride solution consisted essentially of the chlorides of lanthanum, cerium, neodymium and praseodymium with minor amounts of samarium, gadolinium and yttrium. A 20% by weight aqueous slurry of the aluminosilicate was charged to each of three tanks connected in series. The rare earth flowed into the first tank at a rate sufficient to replace the total solution in the three tanks once every hour. The effluent from the third tank was continuously filtered and the filter cake recycled to the first tank. The treatment was carried out for 24 hours, after which the treated material was washed free of chloride, dried at 250° F. and calcined at 1000° F. for three hours. The final product analyzed 0.22% by weight sodium and 26.5% by weight rare earth, determined as rare earth oxide.

The catalyst prepared above was evaluated in the hydroisomerization of normal hexane utilizing a liquid phase operation. The isomerization was carried out at a temperature of 400° F. under a pressure of 400 p.s.i.g. utilizing a hexane space velocity of 0.10 LHSV and a hydrogen/hexane ratio of 1.5 to 1 moles. The results tabulated in the table below were obtained by analysis of the product with a temperature programmed gas chromatograph.

TABLE

| Time on Stream, Hrs | Charge | 4.0 |
|---|---|---|
| Analysis, Percent Wt.: | | |
| Lights | 0.05 | 1.2 |
| Isobutane | 0.05 | 9.6 |
| N-Butane | | 0.8 |
| Isopentane | | 9.1 |
| N-Pentane | | 1.1 |
| 2,2-Dimethylbutane | | 3.2 |
| 2,3-Dimethylbutane+2-methylpentane | 0.1 | 20.0 |
| 3-Methylpentane | 4.2 | 9.9 |
| N-Hexane | 94.3 | 39.9 |
| Unidentified | | 0.7 |
| Do | 0.3 | 3.8 |
| Do | 1.0 | 0.7 |

As shown by the above data the catalyst of the invention is highly active in the liquid phase isomerization of normal hexane at extremely low temperatures. At 400° F. 58% by weight of the hexane in the feed material was converted with good selectivity.

*Example 84*

An aluminosilicate containing both hydrogen ions and rare earth cations was prepared by treating a synthetic crystalline aluminosilicate, identified as Zeolite 13X, with an aqueous solution containing 5 percent by weight of a mixture of rare earth chloride hexahydrate and 2 percent by weight of ammonium chloride, until the sodium cations originally present on the aluminosilicate were reduced to a low level. The aluminosilicate was then washed with water until the effluent was substantially free of chloride ions, dried in air for 20 hours at 230° F., pelleted and sized 14 by 25 mesh, calcined 10 hours at 1000° F. and then treated with atmospheric steam for 20 hours at 1225° F. at atmospheric pressure. The rare earth hydrogen aluminosilicate obtained contained 27.5 weight percent of rare earth determined as rare earth oxides.

The rare earth hydrogen aluminosilicate was then impregnated under vacuum with an ammonium tungstate solution to which sufficient citric acid had been added to arrive at a pH of 6.5. The aluminosilicate was then dried for 16 hours at 230° F. and subjected to a controlled oxidation in an atmosphere consisting essentially of 2 percent oxygen and 98 percent nitrogen until all the carbonaceous material formed by the citrate had been removed. Following this treatment, the aluminosilicate was again vacuum-impregnated with an aqueous solution of nickel nitrate hexahydrate, dried at 230° F. for 16 hours, calcined 3 hours at 1000° F., and then subjected to a hydrogen reducing atmosphere for 2 hours at 450° F. and an additional 2 hours at 950° F. The final catalyst analyzed about 4 percent by weight nickel and 10 percent by weight tungsten.

A 3 milliliter sample of the catalyst prepared above was placed in a glass reactor, purged with helium at atmospheric pressure for one hour at 1000° F. and then cooled to 900° F. 60 cc./minute of helium saturated with toluene at room temperature was continuously passed over the catalyst at 900° F. for one hour. The product stream was sampled for direct chromatographic analysis every 20 minutes and the following illustrates the results:

TABLE

| | Weight percent |
|---|---|
| Conversion of toluene | 26.3 |
| Benzene obtained | 14.1 |
| Xylenes obtained | 11.6 |

This application is a continuation-in-part of applications Serial No. 42,284, filed July 12, 1960; and Serial No. 215,272 and Serial No. 215,291, both filed August 7, 1962.

What is claimed is:

1. In the process for cracking a hydrocarbon charge stream with a solid porous catalyst wherein the products comprise both economically valuable liquid hydrocarbons boiling in the motor fuel range and undesirable by-products of lesser economic significance the improvement in selectivity, evidenced by the production of a substantially greater amount of said valuable liquid hydrocarbons together with concomitant reduction in the yield of undesired by-products from a given hydrocarbon charge, which comprises contacting said charge under cracking conditions with a crystalline aluminosilicate having an ordered crystalline structure having no more than 0.25 equivalent per gram atom of aluminum of alkali metal wherein the enhanced selectivity of said aluminosilicate arises from the fact that it has associated therewith both rare earth cations and ions selected from the group consisting of hydrogen, hydrogen precursors and mixtures thereof.

2. The process of claim 1 wherein the aluminosilicate has both rare earth cations and hydrogen ions associated therewith.

3. The process of claim 1 wherein the aluminosilicate has both rare earth cations and ammonium ions associated therewith.

4. A crystalline aluminosilicate having an ordered crystalline structure having no more than 0.25 equivalent per gram atom of aluminum of alkali metal cations and having associated therewith both rare earth cations and a positive ion selected from the group consisting of hydrogen, hydrogen precursors and mixtures thereof.

5. A crystalline aluminosilicate having an ordered crystalline structure having from 0.6 to 1.0 equivalent per gram atom of aluminum of ions of positive valence of which no more than 0.25 equivalent are alkali metal cations and having associated with said crystalline aluminosilicate both rare earth cations and ions selected from the group consisting of hydrogen, hydrogen precursors and mixtures thereof.

6. A crystalline aluminosilicate having an ordered crystalline structure having from 0.6 to 1.0 equivalent per gram atom of aluminum of ions of positive valence of which no more than 0.25 equivalent are alkali metal cations and having associated with said crystalline aluminosilicate both rare earth cations and ions selected from the group consisting of hydrogen, hydrogen precursors and mixtures thereof wherein the rare earth cations are between 10 and 95% of the total equivalents.

7. A crystalline aluminosilicate having an ordered crystalline structure having from 0.6 to 1.0 equivalent per gram atom of aluminum of ions of positive valence of which no more than 0.25 equivalent are alkali metal cations and having associated with said crystalline aluminosilicate both rare earth cations which are predominantly of the class consisting of lanthanum, praseodymium, samarium, gadolinium, neodymium and mixtures thereof and ions selected from the group consisting of hydrogen, hydrogen precursors and mixtures thereof.

8. A method of preparing a catalyst composition which comprises contacting a crystalline aluminosilicate having an ordered crystalline structure with both rare earth cations and positive ions selected from the group consisting of hydrogen, hydrogen precursors and mixtures thereof, said contacting being carried out for a period of time sufficient to reduce the alkali metal content to no more than 0.25 equivalent per gram atom of aluminum.

9. A method of preparing a catalyst composition which comprises contacting a crystalline aluminosilicate having an ordered crystalline structure with a fluid medium containing both rare earth cations and ammonium ions, said contacting being carried out for a period of time sufficient to reduce the alkali metal content to no more than 0.25 equivalent per gram atom of aluminum.

10. A method of preparing a catalyst composition which comprises treating a crystalline aluminosilicate having an ordered crystalline structure having from 0.6 to 1.0 equivalent per gram atom of aluminum of alkali metal cations with both rare earth cations and a positive ion selected from the group consisting of hydrogen, hydrogen precursors and mixtures thereof for a period of time sufficient to reduce the alkali metal content to no more than 0.25 equivalent.

11. A method of preparing a catalyst composition which comprises contacting faujasite with both rare earth cations and a positive ion selected from the group consisting of hydrogen ions, hydrogen precursors and mixtures thereof for a period of time sufficient to reduce the sodium content to no more than 0.25 equivalent per gram atom of aluminum.

12. A method of preparing a catalyst composition which comprises treating a crystaline aluminosilicate having an ordered crystalline structure having from 0.6 to 1.0 equivalent per gram atom of aluminum of alkali metal cations with both rare earth cations and a positive ion selected from the group consisting of hydrogen, hydrogen precursors and mixtures thereof for a period of time sufficient to reduce the alkali metal content to no more than 0.25 equivalent and thereafter treating the resulting composition with steam.

13. In the catalytic cracking of a hydrocarbon oil to produce hydrocarbons of a lower boiling range, the improvement of contacting said oil under cracking conditions with discrete particles of a crystalline aluminosilicate having an ordered crystalline structure having from 0.6 to 1.0 equivalent per gram atom of aluminum of ions of positive valence of which no more than 0.25 equivalent are alkali metal cations and having associated with said crystalline aluminosilicate both rare earth cations and hydrogen ions.

14. In the catalytic cracking of a hydrocarbon oil to produce hydrocarbons of lower boiling range the improvement of contacting said oil under cracking conditions with a faujasite having no more than 0.25 equivalent per gram atom of aluminum of alkali metal cations and having associated therewith both rare earth cations and hydrogen ions.

15. In the catalytic cracking of a hydrocarbon oil to produce hydrocarbons of lower boiling range the improvement of contacting said oil under cracking conditions with a faujasite having a silica to alumina ratio less than 3 and having no more than 0.25 equivalent per gram atom of aluminum of alkali metal cations and having associated therewith both rare earth cations and hydrogen ions.

16. In the catalytic cracking of a hydrocarbon oil to produce hydrocarbons of lower boiling range the improvement of contacting said oil under cracking conditions with a faujasite having a silica to alumina ratio greater than 3.0 and having no more than 0.25 equivalent per gram atom of aluminum of alkali metal cations and having associated therewith both rare and earth cations and hydrogen ions.

17. The composition of claim 4 wherein the aluminosilicate is admixed with a porous matrix.

18. The composition of claim 17 wherein the porous matrix is an inorganic oxide gel.

19. The composition of claim 17 wherein the porous matrix is selected from the group consisting of silica, alumina and combinations thereof.

20. The composition of claim 5 wherein the aluminosilicate is admixed with a porous matrix.

21. The composition of claim 20 wherein the porous matrix is an inorganic oxide gel.

22. The composition of claim 20 wherein the porous matrix is selected from the group consisting of silica, alumina and combinations thereof.

23. The method of claim 8 wherein the aluminosilicate is admixed with a porous matrix.

24. The method of claim 9 wherein the aluminosilicate is admixed with a porous matrix.

25. The method of claim 10 wherein the aluminosilicate is admixed with a porous matrix.

26. The method of claim 25 wherein the porous matrix is an inorganic oxide gel.

27. The method of claim 25 wherein the porous matrix is selected from the group consisting of silica, alumina and combinations thereof.

28. The method of claim 11 wherein the aluminosilicate is admixed with a porous matrix.

29. The process of claim 13 wherein the aluminosilicate is admixed with a porous matrix.

30. The process of claim 29 wherein the porous matrix is an inorganic oxide gel.

31. The process of claim 29 wherein the porous matrix is selected from the group consisting of silica, alumina and combinations thereof.

32. The process of claim 14 wherein the aluminosilicate is admixed with an inorganic oxide gel.

33. The process of claim 15 wherein the aluminosilicate is admixed with a porous matrix selected from the group consisting of silica, alumina and combinations thereof.

34. The process of claim 16 wherein the aluminosilicate is admixed with a porous matrix selected from the group consisting of silica, alumina and combinations thereof.

35. A process for converting a hydrocarbon charge which comprises contacting the same under conversion conditions with a catalyst comprising a crystalline aluminosilicate having an ordered crystalline structure having no more than 0.25 equivalent per gram atom of aluminum of alkali metal and having associated therewith both rare earth cations and positive ions selected from the group consisting of hydrogen, hydrogen precursors and mixtures thereof.

36. The process of claim 35 wherein the aluminosilicate is admixed with a porous matrix.

37. A catalyst composition comprising a porous matrix and a crystalline aluminosilicate having an ordered crystalline structure and having associated therewith both rare earth cations and positive ions selected from the group consisting of hydrogen, hydrogen precursors and mixtures thereof, said compositions having a sodium content of less than about 4 weight percent.

38. In the process of cracking a hydrocarbon charge stream with a solid porous catalyst wherein the products comprise both economically valuable liquid hydrocarbons boiling in the motor fuel range and undesirable by-products of lesser economic significance the improvement in selectivity, evidenced by the production of a substantially greater amount of said valuable liquid hydrocarbons together with concomitant reduction in the yield of undesired by-products from a given hydrocarbon charge, which comprises contacting said charge under cracking conditions with a catalyst composition having a sodium content of less than about 4 weight percent and comprising a porous matrix and crystalline aluminosilicate having an ordered crystalline structure wherein the enhanced selectivity of said catalyst composition arises from the fact that the crystalline aluminosilicate has associated therewith both rare earth cations and ions selected from the group consisting of hydrogen, hydrogen precursors and mixtures thereof.

References Cited in the file of this patent

UNITED STATES PATENTS

| | | |
|---|---|---|
| 2,882,243 | Milton | Apr. 14, 1959 |
| 2,882,244 | Milton | Apr. 14, 1959 |
| 2,962,435 | Fleck et al. | Mar. 29, 1960 |
| 2,971,903 | Kimberlin et al. | Feb. 14, 1961 |
| 2,971,904 | Gladrow et al. | Feb. 14, 1961 |
| 3,006,153 | Cook | Oct. 31, 1961 |
| 3,033,778 | Frillette | May 8, 1962 |
| 3,039,953 | Eng | June 19, 1962 |
| 3,059,993 | Barner et al. | Oct. 23, 1962 |
| 3,130,006 | Rabo et al. | Apr. 21, 1964 |
| 3,130,007 | Breck | Apr. 21, 1964 |

FOREIGN PATENTS

| | | |
|---|---|---|
| 1,098,929 | Germany | Feb. 9, 1961 |